United States Patent
Kobayashi

[11] Patent Number: 5,901,573
[45] Date of Patent: May 11, 1999

[54] CONDENSER STRUCTURE WITH LIQUID TANK

[75] Inventor: Hideo Kobayashi, Tokyo, Japan

[73] Assignee: Calsonic Corporation, Tokyo, Japan

[21] Appl. No.: 08/742,757

[22] Filed: Nov. 1, 1996

[30] Foreign Application Priority Data

| Nov. 2, 1995 | [JP] | Japan | 7-285987 |
| Nov. 22, 1995 | [JP] | Japan | 7-304477 |
| Feb. 13, 1996 | [JP] | Japan | 8-025090 |
| May 15, 1996 | [JP] | Japan | 8-120591 |
| Aug. 12, 1996 | [JP] | Japan | 8-212751 |

[51] Int. Cl.$^6$ .................................................. F25B 39/04
[52] U.S. Cl. ............................... 62/507; 62/509; 165/132
[58] Field of Search ........................ 62/506, 507, 509; 165/132

[56] References Cited

U.S. PATENT DOCUMENTS

| 3,077,927 | 2/1963 | White et al. | 165/132 |
| 5,159,821 | 11/1992 | Nakamura | 62/509 |
| 5,224,358 | 7/1993 | Yamanaka et al. | 62/509 |
| 5,546,761 | 8/1996 | Matsuo et al. | 62/509 |
| 5,628,206 | 5/1997 | Baba | 62/507 |

*Primary Examiner*—William E. Tapolcal
*Attorney, Agent, or Firm*—Sughrue, Mion, Zinn, Macpeak & Seas, PLLC

[57] ABSTRACT

A connection block fixed to a condenser is firmly coupled with a mounting block fixed to a liquid tank by means of a bolt. In a state that those are firmly coupled, a supported part of the mounting block is put on a flat supporting face of the connection block. In this state, the refrigerant outlet port of the condenser is communicatively coupled with the refrigerant inlet port of the liquid tank.

12 Claims, 16 Drawing Sheets

CONDENSER STRUCTURE WITH LIQUID TANK

BACKGROUND OF THE INVENTION

1. Field of the Invention

The present invention relates to a condenser structure with a liquid tank, which is used with a vapor compressing type refrigerator for car air conditioners. The condenser is connected in series between a compressor and an evaporator, and condenses refrigerant to radiate heat from the refrigerant, removes the water content and foreign materials from the refrigerant, and then feeds the clean refrigerant to the evaporator.

2. Description of the Related Art

A refrigerator of the vapor compressing type is incorporated into a car air conditioner for controlling temperature in a car room and dehumidifying air in the car room. This type of the refrigerator is disclosed in Japanese Patent Publication No. Hei. 4-95522. A circuit diagram showing the basic construction of the refrigerator is shown in FIG. 23. In the figure, gaseous refrigerant at high temperature and high pressure is discharged from a compressor 1 and passes through a condenser 2. When passing through the condenser, a heat exchange between the refrigerant and air is performed, so that the refrigerant is decreased in temperature, condensed and liquidized. The resultant liquid refrigerant is temporarily stored in a liquid tank 3, and then fed to an evaporator 5 through an expansion valve 4. In the evaporator 5, the liquid refrigerant is evaporated. In the process of evaporating the refrigerant, the evaporator temperature decreases as the result of absorbing the latent heat. Accordingly, if air to be air conditioned is applied to the evaporator 5, temperature of the air decreases and the air is dehumidified. The refrigerant evaporated in the evaporator 5 is sucked by the compressor 1. Then, the refrigerating cycle is repeated.

In the vapor compressing type refrigerator for car air conditioners, the liquid tank 3 is manufactured separately from the condenser 2, and placed in the middle of the pipe which connects the condenser 2 to the evaporator 5. In the case of the refrigerator in which the condenser 2 and the liquid tank 3 are separately provided, a large space is required for installing the liquid tank 3 therein, and vibration-proof measures must be taken for the condenser 2 and the liquid tank 3, respectively.

To solve those problems, there are many proposals as disclosed in Japanese Patent Publication Nos. Hei. 3-87572, 4-103973, 4-131667, and the like. The proposal disclosed in Japanese Patent Publication No. Hei. 4-103973 is schematically shown in FIG. 24. As shown, a condenser 2 includes a couple of header pipes 6a and 6b which are extend vertically (when viewed also in FIG. 24) and spaced horizontally (when viewed in FIG. 24). A plural number of flat heat transferring pipes 7 are disposed between the couple of the header pipes 6a and 6b. These flat heat transferring pipes 7 are horizontally extended and vertically spaced. Both ends of the heat transferring pipes 7 are air- and liquid-tightly coupled with the header pipes 6a and 6b so that the inner flow passages of the flat heat transferring pipes 7 communicate with the inner sides of the header pipes 6a and 6b, respectively. Corrugated fins 8 formed of zig-zagged thin metal plate are located between the adjacent flat heat transferring pipes 7, to thereby form a core section 9. Side plates 10 and 11 are provided on the upper and lower sides of the core section 9, respectively. The both end portions of the side plates 10 and 11 are fastened to the inner sides of the upper and the lower ends of the header pipes 6a and 6b, respectively.

In the thus constructed condenser 2, the core section 9 effects heat exchange between the refrigerant flowing through the flat heat transferring pipes 7 and air flowing along the flat heat transferring pipes 7, and condenses and liquidizes the refrigerant. Gaseous refrigerant is fed into an inlet pipe 12, which is provided at the top of the header pipe 6a (located on the right side in FIG. 24). The refrigerant flows between the header pipe 6a and the header pipe 6b (located on the left side in FIG. 24) in going/returning manner, through the flat heat transferring pipes 7 of the core section 9. During this flow of the gaseous refrigerant, the refrigerant is condensed and liquidized. The resultant liquid refrigerant is gathered in the lower end of the header pipe 6a, and fed through a refrigerant transporting pipe 13 to the liquid tank 3.

The liquid tank 3 is fastened onto the outer surface of the header pipe 6a. Specifically, a cylindrical case 14, which defines the liquid tank 3, is fastened to the side wall of the header pipe 6a by means of hard soldering or brazing. An opening of the bottom of the case 14 is closed with a bottom plate 15, while an opening of the top of the case 14, with a top plate 16. The refrigerant transporting pipe 13 is inserted through the bottom plate 15 into the case 14 so as to extend passing through the axis of the center of the case. A cylindrical space 18 is formed between the outer surface of the refrigerant transporting pipe 13 and the inner surface of the case 14. A number of small holes 17 are perforated in the upper portion of the refrigerant transporting pipe 13 that is located in the upper portion of the case 14. Liquid refrigerant, which was fed from the header pipe 6a to the refrigerant transporting pipe 13, may flow out through the small holes of the refrigerant transporting pipe 13. In the mid portion of the cylindrical space 18, a filter 19, a drying agent 20 and a porous holder plate 21 are stacked in this order when counted from the lower side. The filter 19 is made of porous material, such as felt, and has a function to filter foreign materials, for example, dust. The drying agent 20 is made of silica gel, calcium chloride, or the like. The porous holder plate 21 is formed with a wire net, punching metal, or the like. An outlet pipe 22 is provided at the lower end of the case 14. The liquid refrigerant, which is gathered in the lower end of the cylindrical space 18, flow out through the outlet pipe 22.

In operating the liquid-tank combined condenser thus constructed (or the vapor compressing type refrigerator having such a condenser incorporated thereinto), the refrigerant flows in the direction of arrows, and is condensed and liquidized in the condenser 2 and then is fed to the liquid tank 3. The water content, foreign material and the like are removed from the refrigerant in the liquid tank 3, and the refrigerant thus made clean is discharged through the outlet pipe 22 into the expansion valve 4 located in the prestage of the evaporator 5 (see FIG. 23). The liquid-tank condenser thus constructed and operated is advantageous in that the condenser 2 and the liquid tank 3 may be handled as one body. Accordingly, it may readily be installed in a limited space within an engine room. One vibration-proof measure suffices for both the condenser 2 and the liquid tank 3. In other words, there is no need of taking the vibration-proof measures for the condenser and the tank, respectively. In this respect, the installing work of the condenser is easy.

In the conventional liquid-tank combined condenser structure (first example) shown in FIG. 24, the case 14 is directly mounted on the outer surface of the heater pipe 6a. Other conventional liquid-tank combined condenser structures are disclosed in the publication (Japanese Patent Publication 10. Hei. 4-103973). In the condenser structures, the case 14 is indirectly mounted on the outer surface of the header pipe 6a, as shown in FIGS. 25 to 28. In the condenser structure (second example) shown in FIGS. 25 and 26, the case 14 is mounted on the outer surface of the header pipe 6a in a state that a heat insulating member 23 is located between them. In the condenser structure (third example) shown in FIGS. 27 and 28, the case 14 is mounted on the header pipe 6a by means of a couple of upper and lower brackets 24.

Those conventional liquid-tank combine condenser structures have the following problems.

In the first example of FIG. 24, the case 14 of the liquid tank 3 must be hard soldered onto the header pipe 6a of the condenser 2 over the entire length of the contact area between them. Accordingly, heat of the header pipe 6a is directly transferred to the case 14. As a result, temperature of the liquid refrigerant contained in the liquid tank 3 rises, and the performances of the vapor compressing type refrigerator are degraded.

In the example of FIGS. 25 and 26, bonding work is essential, which is for bonding the outer side of the header pipe 6a to one side of the heat insulating member 23 and the inner side of the case 14 to the other side of the heat insulating member 23. Use of only the hard soldering work of aluminum material is insufficient for manufacturing the liquid-tank combined condenser structure. Accordingly, the manufacturing work is complicated and the cost to manufacture is increased.

In the third example of FIGS. 27 and 28, a gap 25 is present between the outer surface of the header pipe 6a and the inner surface of the case 14. Air flows through the gap 25. This air flow acts to decrease the efficiency of the condenser 2. Specifically, in operation, air flows through the spaces defined by the flat heat transferring pipes 7 and the fins 8 (see FIG. 24, but not illustrated in FIGS. 27 and 28). The refrigerant flowing through the flat heat transferring pipes 7 is condensed by the air. When the air flows through the gap 25, the air flowing through the spaces defined by the flat heat transferring pipes 7 and the fins 8, is reduced. The (operating) efficiency of the condenser 2 is reduced.

Furthermore, the conventional liquid-tank combined condenser thus constructed and operated is disadvantageous in that it is impossible to detach the liquid tank 3 from the condenser when the liquid tank 3 is repaired or replaced with another. In other words, when the liquid tank 3 is abnormal and it must be removed for finding its cause and repair the tank, the condenser 2 must be removed together with the tank. This makes the maintenance work of the liquid tank 3 difficult, and increases the maintenance cost. The same thing is correspondingly applied to the invention disclosed in Japanese Patent Publication No. Hei. 3-87572.

Such a structure that the liquid tank is detachable from the condenser is disclosed in Japanese Patent Publication No. Hei. 4-131667. In the structure disclosed, the header pipe is coupled with the liquid tank by fixing them at two locations, i.e., the upper and lower locations. Accordingly, the coupling work is troublesome, and the assembling work, repairing and part replacing work are also troublesome. The result is increase of the cost to manufacture.

SUMMARY OF THE INVENTION

An object of the present invention is to provide a condenser structure with a liquid tank to solve the above problems.

According to a first aspect of the present invention, there is provided a condenser structure with a liquid tank comprising: (1) a condenser including: a pair of header pipes spaced from each other; a plural number of heat transferring pipes disposed between the pair of header pipes so as to be spaced each other, both ends of the heat transferring pipes being opened to an inside of the header pipes; and fins disposed between the adjacent heat transferring pipes spaced each other; (2) a liquid tank fastened to the first header pipe so as to receive a liquid refrigerant discharged from a discharging port of the condenser and form a gap between an outside of the first header pipe and one side of the liquid tank; and (3) a guide plate disposed in the gap so as to close the gap and prevent air from passing through the gap.

According to a second aspect of the invention, there is provided a condenser structure with a liquid tank comprising: (1) a condenser including: a pair of header pipes spaced from each other; a plural number of heat transferring pipes disposed between the pair of header pipes so as to be spaced each other, both ends of the heat transferring pipes being opened to an inside of the header pipes; and fins disposed between the adjacent heat transferring pipes spaced each other; (2) a liquid tank fastened to the first header pipe so as to receive a liquid refrigerant discharged from the condenser; (3) first coupling means for detachably coupling the first header pipe with the liquid tank while securing a flowing path of the liquid refrigerant; and (4) second coupling means for detachably coupling the first header pipe with the liquid tank so as to temporarily couple the first header pipe with the liquid tank before the first coupling means couples thereof.

DETAILED DESCRIPTION OF THE PREFERRED EMBODIMENTS

1st Embodiment

Figure 1:
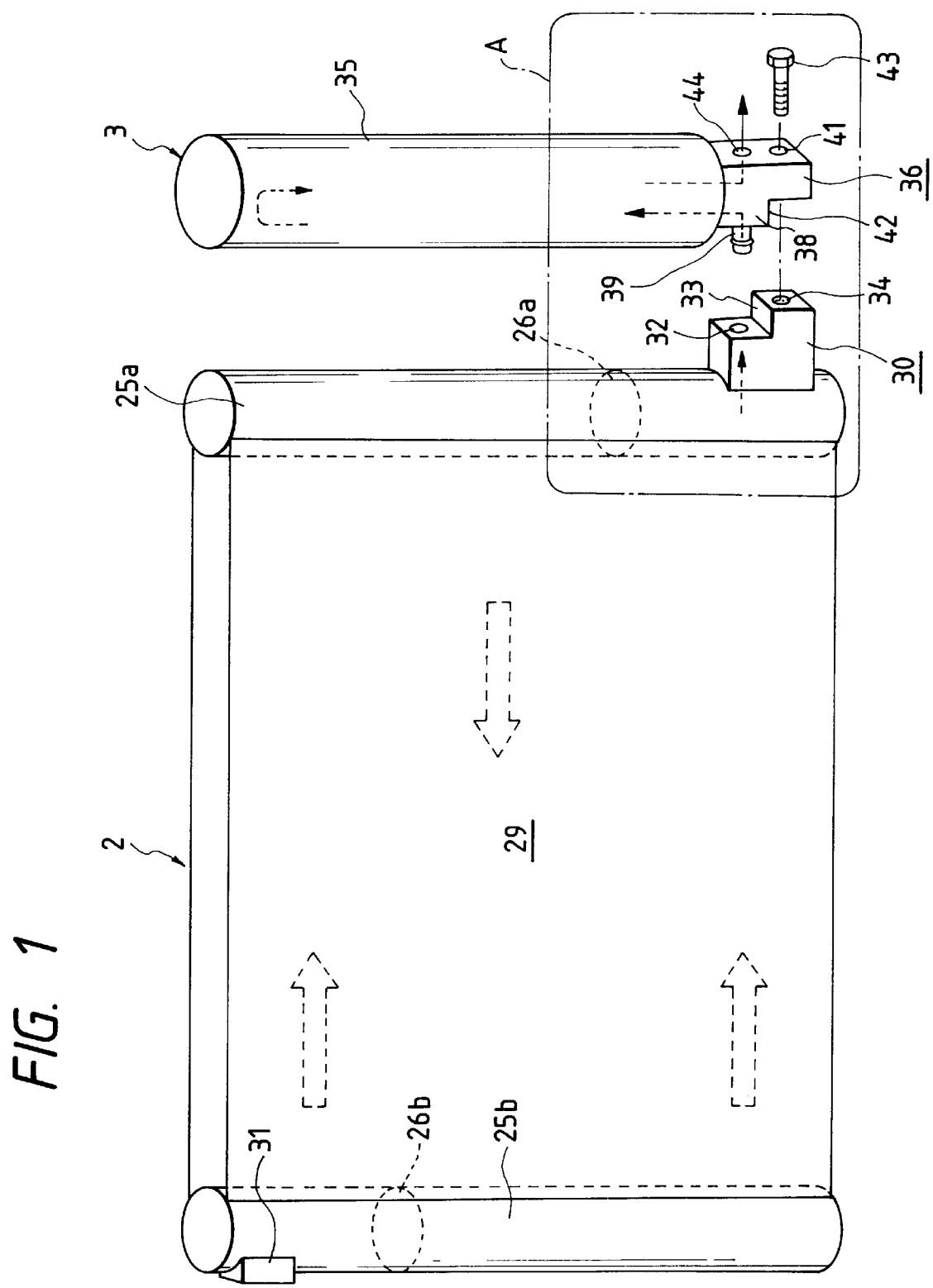
FIG. 1 is a front view showing a liquid-tank combined condenser structure according to a first embodiment of the present invention, the condenser structure being illustrated in a state that the liquid tank is removed from the condenser.
Figure 2:
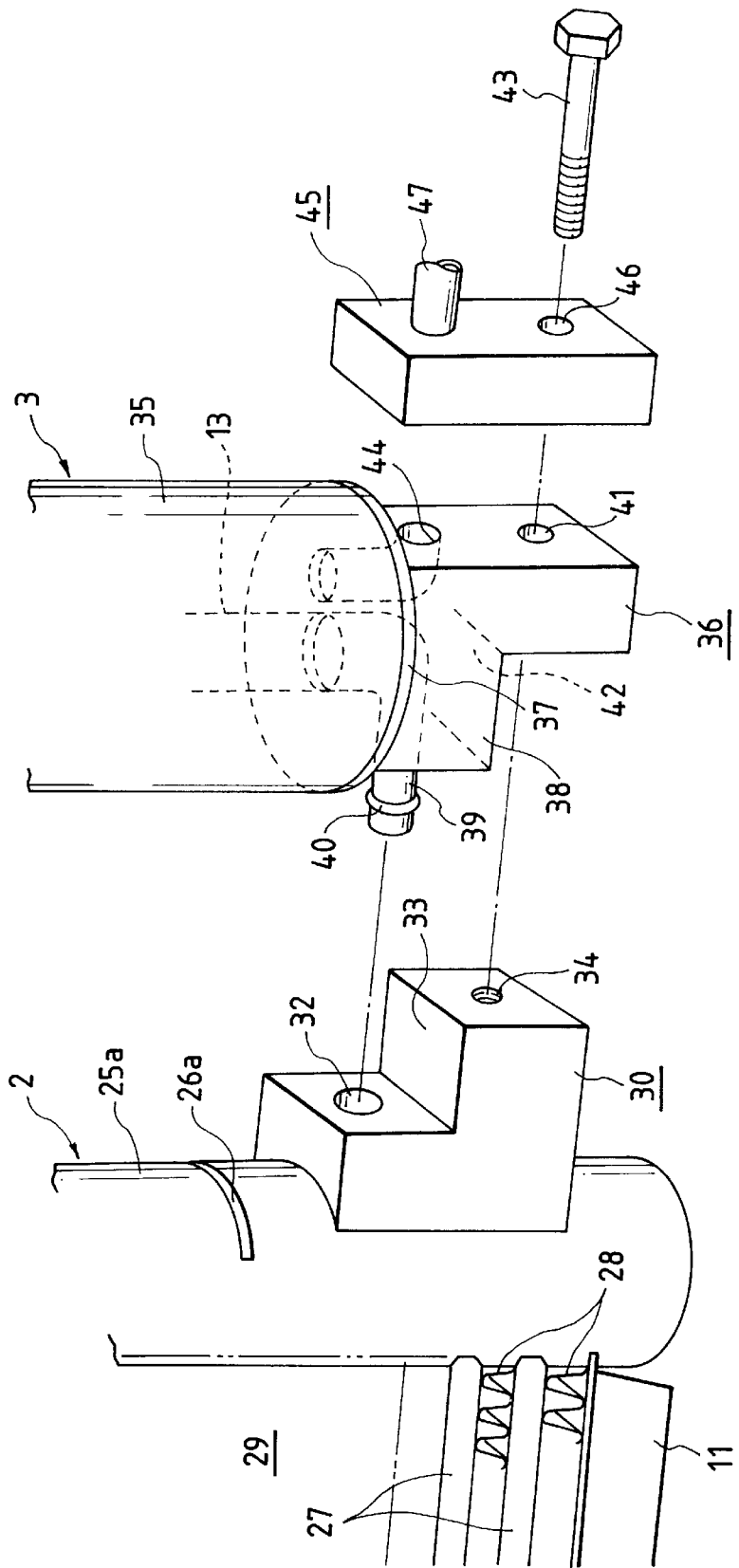
FIG. 2 is an enlarged view showing a portion A in FIG. 1.

Referring to FIGS. 1 and 2, there is shown a first embodiment of the present invention. In the first embodiment, the invention is applied to a condenser structure combined with a liquid tank in one united block (the condenser structure will be referred to a liquid-tank combined condenser structure). The condenser is of the called horizontal flow type in which refrigerant horizontally flows between a couple of header pipes. In the condenser structure of the embodiment, as shown in FIG. 1, a condenser 2 and a liquid tank 3 are disposed in series from a higher part of a refrigerant flow to a lower part thereof with respect to the refrigerant flow direction of arrows. The liquid tank 3 is located by the side of the outlet port 23.

The condenser 2 is constructed including a couple of header pipes 25a and 25b horizontally spaced. Partitioning walls 26a and 26b are respectively provided within the header pipes 25a and 25b, to thereby air- and liquid-tightly partition the middle portions within the header pipes 25a and 25b. The partitioning wall 26a of the header pipe 25a (the right header pipe in FIG. 1) and the partitioning wall 26b of the left header pipe 25b (the left header pipe in FIG. 1) are located at height of different values.

In the condenser 2, a plural number of heat transferring pipes 27 (see FIG. 2) are disposed between the inner surfaces of the header pipes 25a and 25b, respectively. In this case, both ends of the heat transferring pipes 27, respectively, pass through the inner walls (facing each other) of the header pipes 25a and 25b in air- and liquid-tight sealing manner. Those heat transferring pipes 27 are horizontally parallel but vertically spaced. Corrugated fins 28 (FIG. 2) are located between the adjacent heat transferring pipes 27. The heat transferring pipes 27 and the corrugated fins 28 form a core section 29. Side plates 10 and 11 are provided along the upper and lower sides of the core section 29, respectively (see FIG. 7, and a part of the lower side plate 11 alone is illustrated in FIG. 1).

A connection block 30 is fixed to the outer surface of the lower part of the right header pipe 25a at a location thereof below the partitioning wall 26a. An inlet block 31 is fixed to the outer surface of the upper portion of the left header pipe 25b at a location thereof above the partitioning wall 26b. The connection block 30, like the condenser 2 including the right header pipe 25a, is made of aluminum alloy. The connection block 30, shaped like L, is hard soldered to the outer surface (opposite to the outer surface thereof facing the core section 29) of the lower part of the right header pipe 25a in a state that one of the legs of the block is extended radially and outwardly.

The outer face of the upper portion of the connection block 30 is bored to form an outlet port 32. The outlet port 32 communicates with the inside of the lower part of the right header pipe 25a, through the upper part of the connection block 30 and the outer wall of the lower part of the right header pipe 25a. The upper face of the radially and outwardly extended part of the connection block 30 serves as a flat supporting face 33. The extended part of the block is one of the legs of the L shaped block as referred to above. The upper face of the extended part is narrower than that of the other leg of the L-shaped block. The side face of the extended part of the connection block 30 is bored to form a threaded hole 34. Unlike the outlet port 32, the threaded hole 34 does not reach the inside of the right header pipe 25a. In other words, no through-hole is formed at a location of the outer surface of the right header pipe 25a, which is aligned with the threaded hole 34.

The liquid tank 3 includes a cylindrical case 35 and a mounting block 36. The upper end of the case 35 is closed, and the mounting block 36 is fixed to the lower end of the case 35. The mounting block 36 is detachably mounted on the connection block 30. Therefore, the mounting block 36 includes a coupling portion 38, which is located under the lower face of a lid 37, which is for closing the opening of the lower end of the case 35. The coupling portion 38, shaped like an inverse L, is integrally mounted on the under face of the lid 37 in a state that one of the legs of the L-shaped block is radially extended toward the upper part of the connection block 30.

A take-in port 39 is extended from the inner face of the upper part of the coupling portion 38. When the coupling portion 38 forming the mounting block 36 is coupled with the connection block 30, the take-in port 39 of the coupling portion 38 is communicatively connected to the outlet port 32 of the connection block 30. An O-ring 40 is fit to the extreme end of the take-in port 39. When the take-in port 39 communicates with the outlet port 32, the circumference outer edge of the O-ring 40 is elastically put on the inner circumference of the outlet port 32, to thereby seal the connecting part of the take-in port 39 and the outlet port 32.

A through-hole 41 is formed in the lower part of the coupling portion 38 forming the mounting block 36. A flat supported face 42 is the lower face of the upper part of the coupling portion 38, which is extended toward the upper part of the connection block 30. The upper part of the coupling portion 38 is wider than the lower part thereof. The opening of the external side (the right side in FIGS. 1 and 2) of the threaded hole 34 of the connection block 30 is aligned with the opening at the first end of the through-hole 41 when the flat supporting face 33 of the connection block 30 is put on the supported part 42 of the coupling portion 38. To couple the connection block 30 with the mounting block 36, the flat supporting face 33 is put on the supported part 42, the take-in port 39 is inserted into the outlet port 32, and a bolt 43 is inserted into the through-hole 41 from the second end opening (the right side in FIGS. 1 and 2) of the through-hole 41. The extreme end of the bolt 43 is screwed into the threaded hole 34 and tightened.

Figure 24:
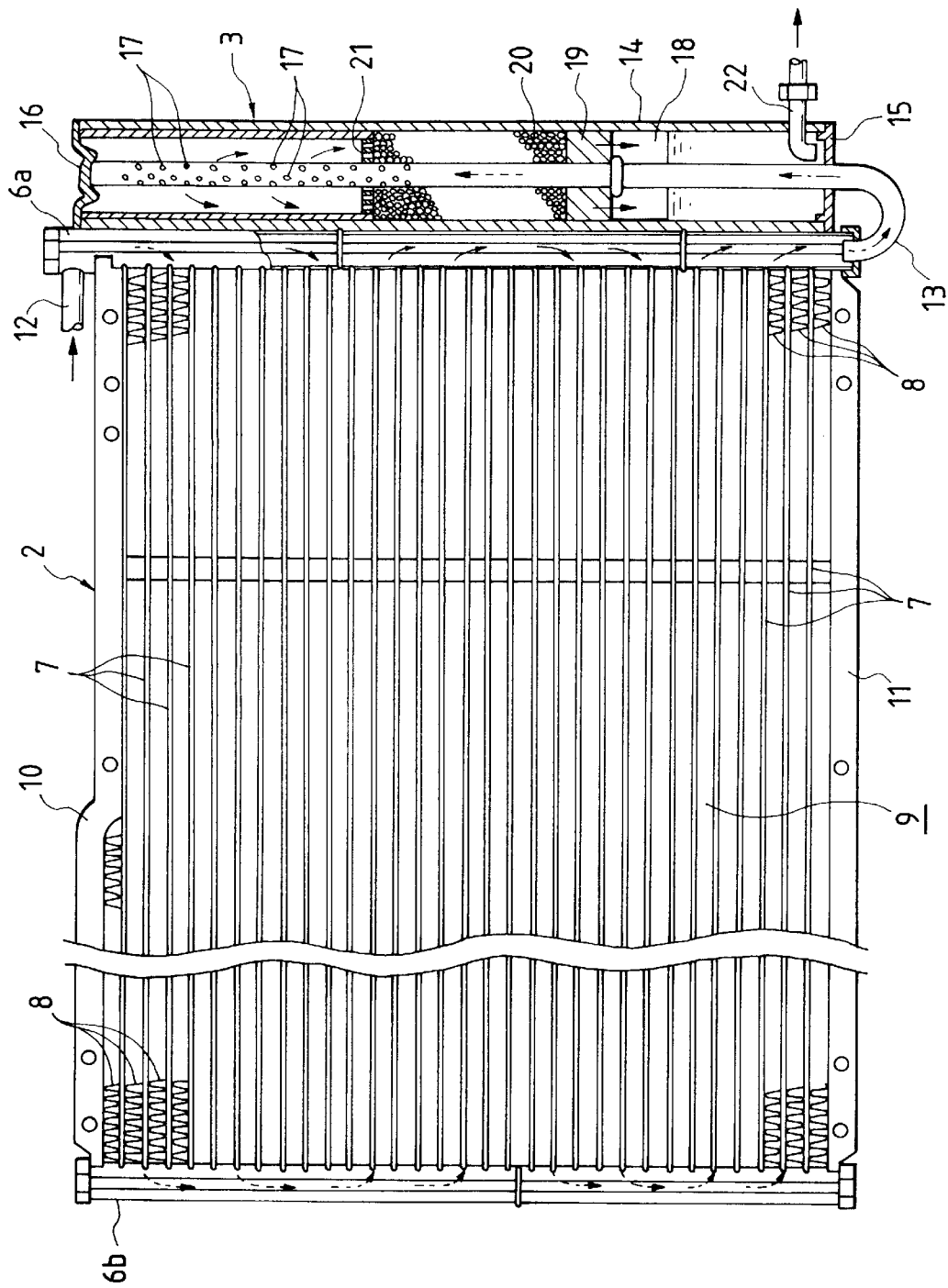
FIG. 24 is a front view showing a conventional liquid-tank combined condenser structure.
Figure 25:
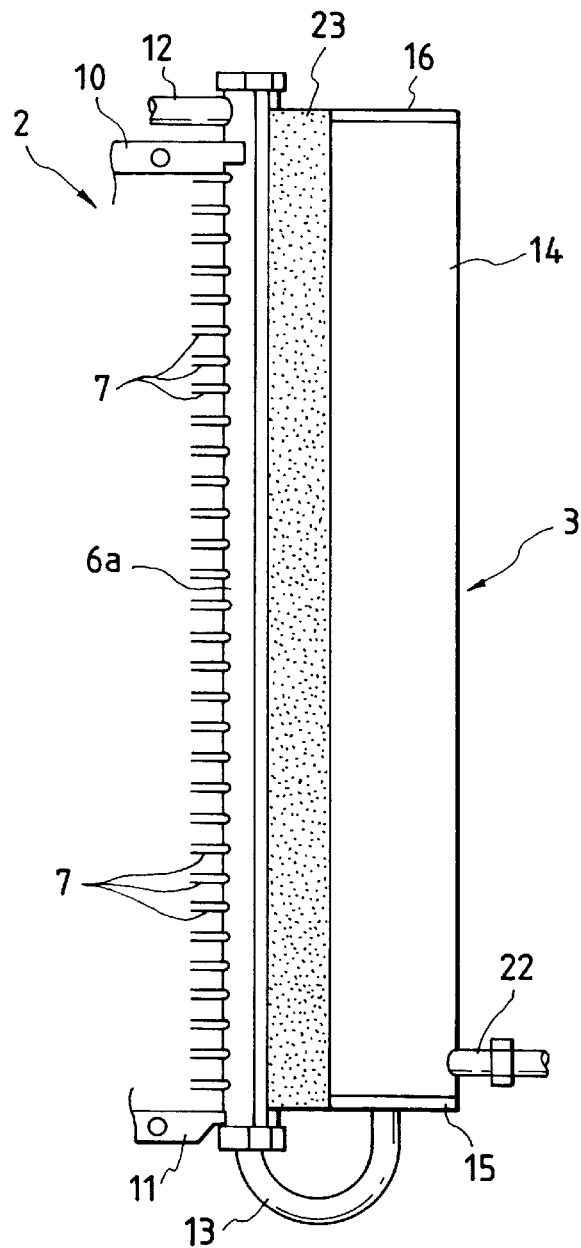
FIG. 25 is an enlarged front view showing another conventional liquid-tank combined condenser corresponding to the right side in FIG. 24.
Figure 26:
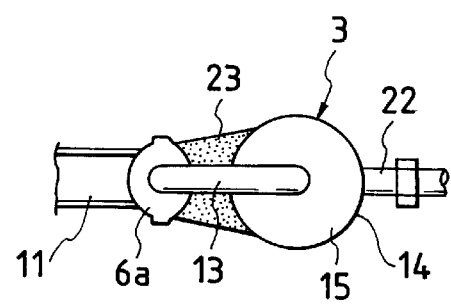
FIG. 26 is a bottom view of the liquid-tank combined condenser structure of FIG. 25.
Figure 27:
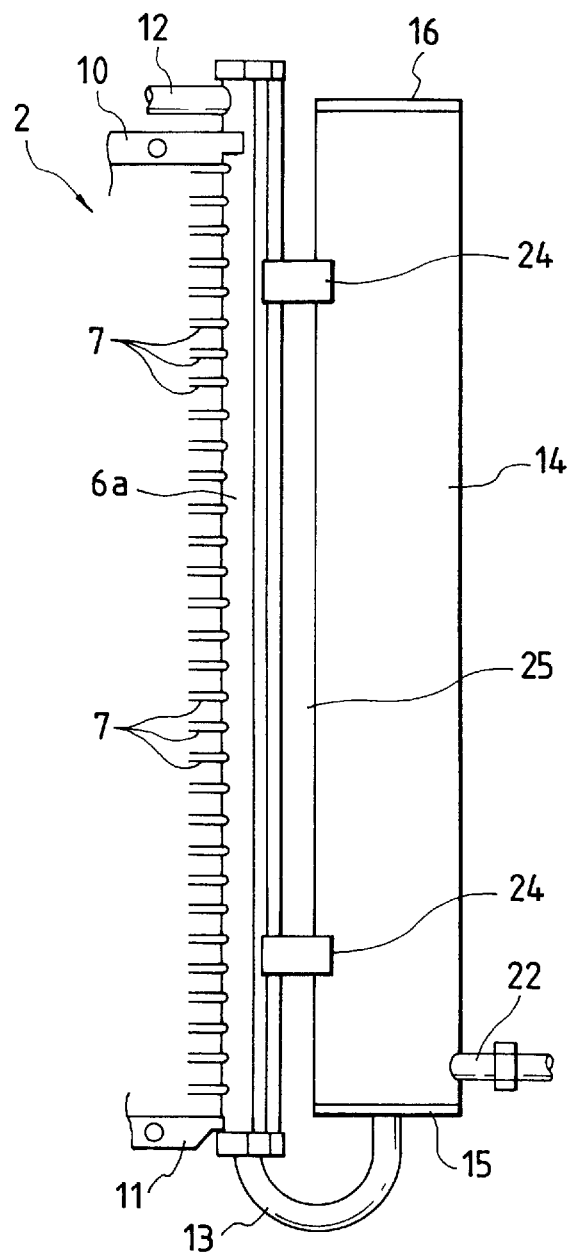
FIG. 27 is an enlarged front view showing still another conventional liquid-tank combined condenser corresponding to the right side in FIG. 24.
Figure 28:
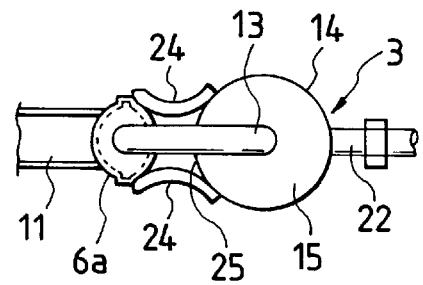
FIG. 28 is a bottom view of the liquid-tank combined condenser structure of FIG. 27.

The upper end of the take-in port 39 is opened in the upper side of the lid 37. The opening is communicatively connected to the lower end of the refrigerant transporting pipe 13. The upper end of the refrigerant transporting pipe 13 is opened into the inside of the upper part of the case 35. A liquid refrigerant is fed from the outlet port 32 into the refrigerant transporting pipe 13, through the take-in port 39, and discharged into the inside of the upper part of the case 35, from the upper opening of the refrigerant inlet pipe 13. As in the conventional structure shown in FIG. 24, a filter 19, a drying agent 20 and a porous holder plate 21 are stacked in the middle of the case 35, to thereby remove water content, foreign materials and the like from the refrigerant. The refrigerant is thus fed to the upper part of the case 35, and after water content and the like are removed from the refrigerant, the refrigerant drops to the bottom of the case 35.

The upper end of an outlet port 44 is opened at a location on the upper side of the lid 37, which is off the upper end opening of the take-in port 39. The lower end of the outlet port 44 is opened in the outer face of the upper part of the coupling portion 38 forming the mounting block 36. The clean liquid refrigerant accumulatively stored in the bottom of the case 35 is drained out of the liquid tank 3 through the outlet port 44. The lower end opening of the outlet port 44 serves as a discharging port of the liquid refrigerant.

Figure 23:
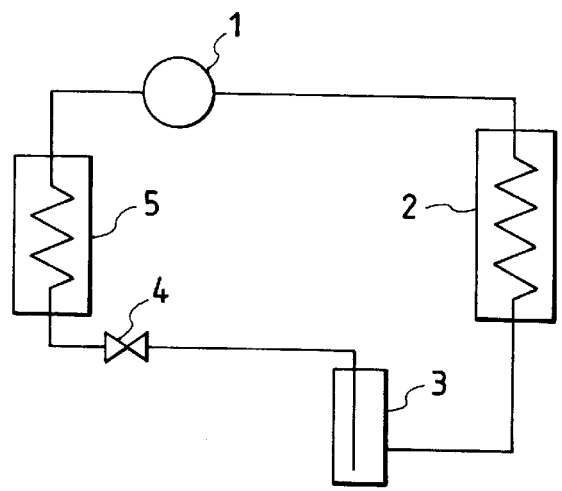
FIG. 23 is a circuit diagram showing a refrigerator of the vapor compressing type into which a condenser and a liquid tank are assembled.

To assemble the thus constructed liquid-tank combined condenser structure of the present invention into a vapor compressing type refrigerator, the downstream end of the refrigerant pipe connecting to the compressor 1 (FIG. 23) is connected to the inlet port of the inlet block 31, and the upstream end of the refrigerant pipe connecting to the evaporator 5 (FIG. 23) is connected to the outlet port 44 of the outlet block 36. To take the clean liquid refrigerant out of the through-hole 24, a coupling block 45 is attached to the outer face of the mounting block 36, as shown in FIG. 2 (not shown in FIG. 1). The coupling block 45 includes a through-hole 46 to be aligned with the through-hole 41 of the mounting block 36. The coupling block 45 is connected to a pipe 47 connecting to the expansion valve 4 (FIG. 23). A location on the coupling block 45 to which the pipe 47 is connected is aligned with the lower end opening of the outlet port 44. To connect the pipe 47 to the mounting block 36 through the coupling block 45, the bolt 43 is passed through through-holes 46 and 41, and screwed into the threaded hole 34 and tightened. When the compressor 1 is operated in this state, the condenser structure with a liquid tank receives the refrigerant from the compressor 1, compresses the refrigerant and then feeds it to the evaporator 5.

The refrigerant gas is fed from the inlet port of the inlet block 31 to the condenser 2, and the refrigerant gas flows between the header pipes 25a and 25b, through the heat transferring pipes 27 of the condenser 2. During the flowing of the refrigerant gas, the desired heat exchange is carried out between the refrigerant gas and air which flows along the heat transferring pipes 27 and through the spaces of the corrugated fins 28. The refrigerant gas is condensed and liquidized. The resultant liquid refrigerant is sent from the outlet port 32 of the connection block 30 to the take-in port 39 of the mounting block 36 forming the liquid tank 3. The liquid refrigerant, which reaches the take-in port 39, is then sent through the refrigerant transporting pipe 13 to the upper portion of the case 35, and flows down within the case 35. The liquid refrigerant, when flowing down, passes through the filter 19 and the drying agent 20, so that the water content, foreign materials, and the like are removed from the liquid refrigerant. Then, the refrigerant is sent through the outlet port 44 to the evaporator 5.

When the liquid tank 3 must be repaired or replaced with a new one, the bolt 43 is unscrewed. The mounting block 36 mounted on the lower end of the liquid tank 3 is detached from the connection block 30 fastened to the side wall of the lower part of the right header pipe 25a. Accordingly, only the liquid tank 3 can be repaired while the condenser 2 is left attached to the car body.

It is noted that in the condenser structure with a liquid tank of the invention, the supported part 42 of the mounting block 36 firmly attached to the liquid tank 3 is put on the flat supporting face 33 of the connection block 30 firmly attached to the condenser 2. Therefore, the condenser 2 supports the weight of the liquid tank 3, and when the condenser 2 is supported by the car body, the liquid tank 3 can reliably be supported by the car body. Accordingly, the liquid tank 3 can reliably be supported by the condenser 2 by only the coupling of the connection block 30 with the mounting block 36.

2nd Embodiment

Figure 3:
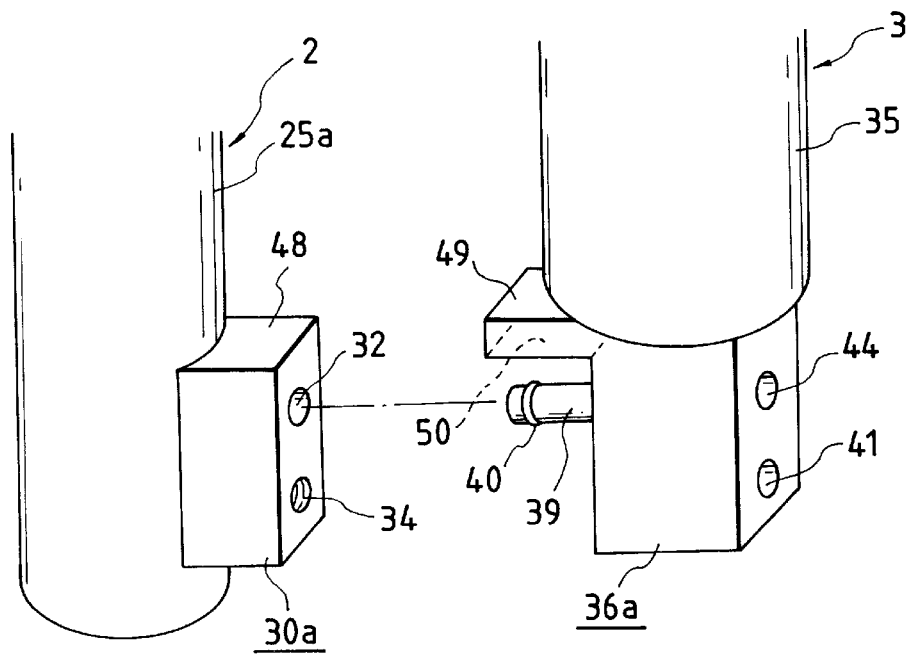
FIG. 3 is an enlarged view showing a portion A in FIG. 1, which is a coupling structure according to a second embodiment of the invention.

In the first embodiment, the connection block 30 and the mounting block 36 are shaped like bold L. However, those blocks may take any of other suitable shapes. For example, the blocks may be shaped as in a second embodiment shown in FIG. 3. In the second embodiment, a connection block 30a is cubic in shape, with the upper face 48 being flat. A mounting block 36a is provided with a protruded part 49, which is protruded toward the upper face 48 of the connection block 30a. The lower side 50 of the protruded part 49 is flat and to be brought into contact with the upper face 48 of the connection block 30a. The inner side surface of the mounting block 36a, located under the protruded part 49, is flat and to be brought into contact with the outer surface of the connection block 30a. The lower face 50 serves as a supported face, and the upper face 48, a supporting face.

3rd Embodiment

Figure 4:
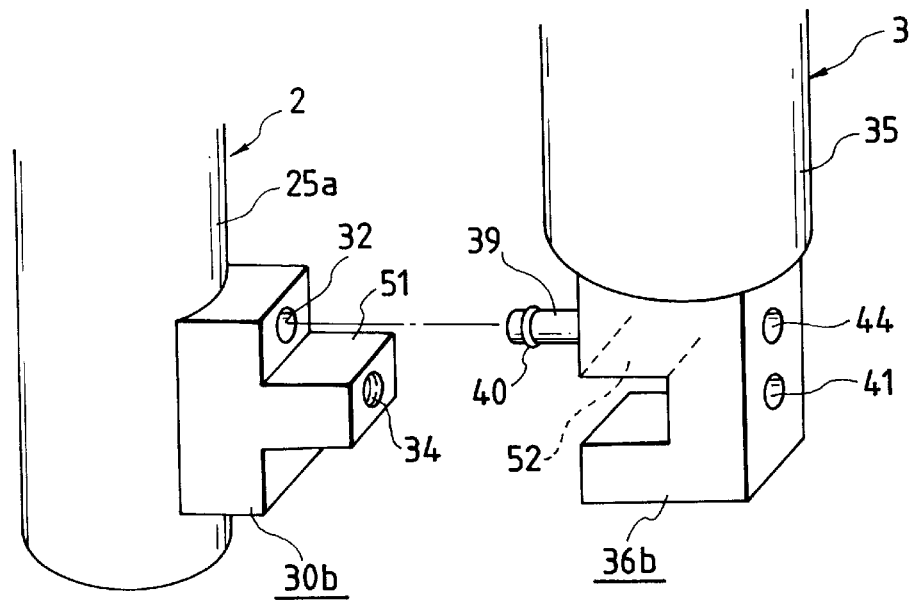
FIG. 4 is an enlarged view showing a portion A in FIG. 1, which is a coupling structure according to a third embodiment of the invention.

Further, the blocks may be also shaped as in a third embodiment shown in FIG. 4. In the third embodiment, a connection block 30b has a protruded part laterally protruded. A mounting block 36b has a groove which is used for receiving the protruded part of the connection block 30b. In the third embodiment, an outlet port 32 is formed in the upper part of the connection block 30b, and a screwed hole 34 is formed in the middle or protruded part of the connection block 30b. The upper face of the protruded part of the connection block 30b serves as a supporting face. The upper side wall of the groove of the mounting block 36b serves as a supported face.

4th Embodiment

Figure 5:
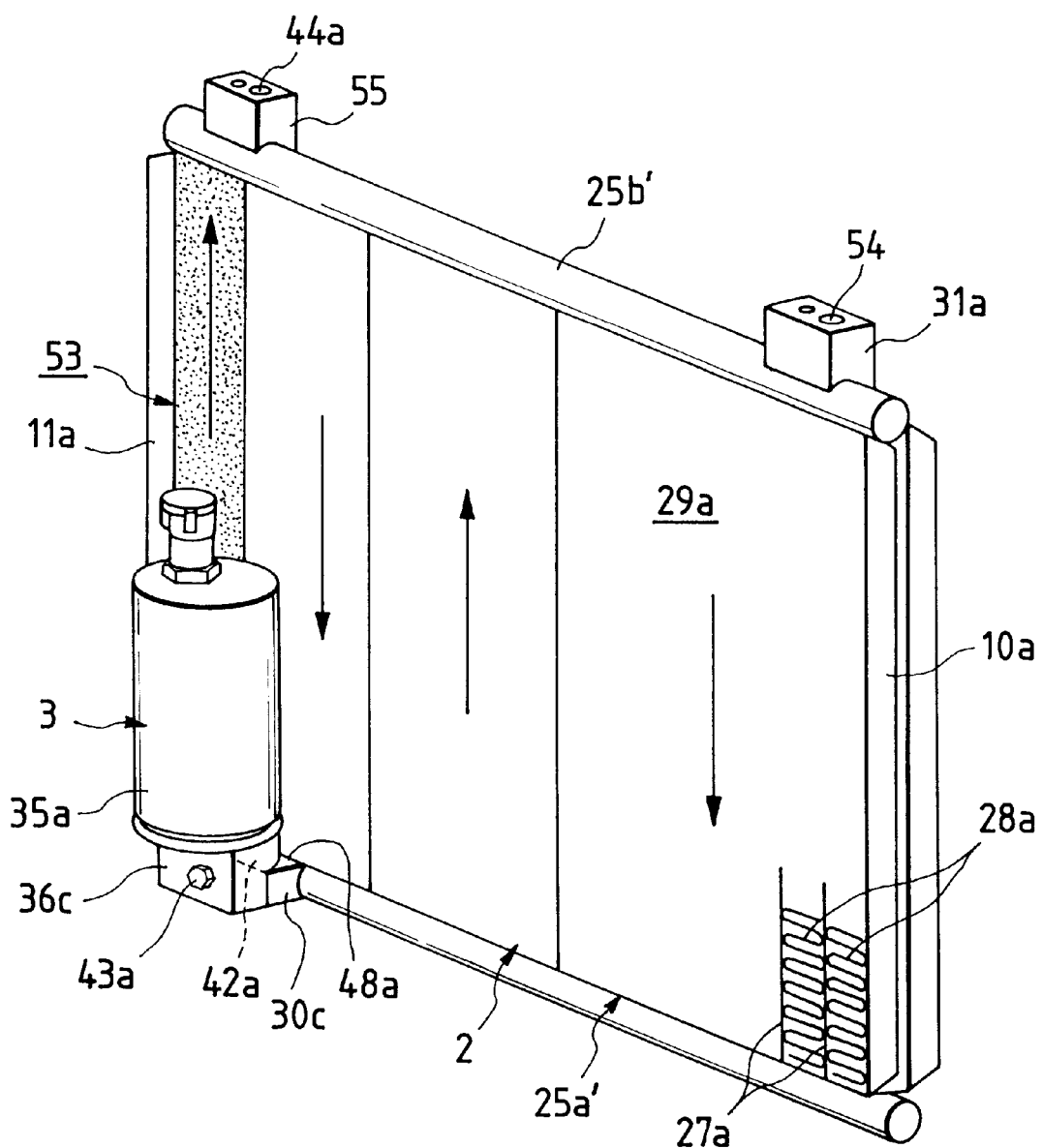
FIG. 5 is a perspective view showing a fourth embodiment of the present invention.

FIG. 5 shows a fourth embodiment of the present invention. In the fourth embodiment, the invention is applied to a condenser structure with a liquid tank and a subcondenser. The condenser and the subcondenser are both of the called vertical flow type in which refrigerant vertically flows between a couple of header pipes. In the liquid-tank combined condenser structure, a subcondenser 53, which is integrally coupled with a condenser 2, is disposed downstream of a liquid tank 3, and serially to the condenser 2 and the liquid tank 3. The condenser 2 and a subcondenser 53 are constructed including a couple of header pipes 25a' and 25b' vertically spaced. Partitioning walls (not shown) are provided on the inner spaces of the portions of the header pipes 25a' and 25b', which are close to the first ends (left ends in FIG. 5) thereof, and the inner spaces of the first end portions (the left end portions in FIG. 5) of the header pipes 25a' and 25b' are air- and liquid-tightly partitioned by the partitioning walls. Portions of the header pipes 25a' and 25b', which are closer to the second ends (right ends in FIG. 5) of the header pipes than to the partitioning walls of the header pipes, form the condenser 2. The remaining portions of the header pipes 25a' and 25b', which are closer to the first ends of the header pipes than to the partitioning walls of the header pipes, form the subcondenser 53. Heat transferring pipes 27a and subheat-transferring pipes (not shown), which form the condenser 2 and the subcondenser 53, are horizontally extended and vertically spaced between the header pipes 25a' and 25b', in a state that fins 28a are placed between the adjacent heat transferring pipes 27a and between the adjacent subheat-transferring pipes. The heat transferring pipes 27a, subheat-transferring pipes and the fins 28a make up a core section 29a. Side plates 10s and 11a are disposed along the upper and lower sides of the core section 29a, respectively.

A connection block 30c is hard soldered to the front side of a first end of the lower header pipe 25a' (located in the lower portion in FIG. 5). An inlet block 31a is also hard soldered to the upper side of a second end of the upper header pipe 25b' (located in the upper portion in FIG. 5). The connection block 30c includes a discharging port at a location closer to the center of the lower header pipe 25a' (closer to the right side in FIG. 5), and a feeding port located to the end thereof (closer to the left side in FIG. 5). The discharging port communicates with the inside of a part of the lower header pipe 25a' at a location closer to the center of the lower header pipe 25a' than the partitioning wall therein. The feeding port communicates with the inside of the remaining part of the lower header pipe 25a' at a location closer to the end of the lower header pipe 25a' than the partitioning wall. In this embodiment, the upper face 48a of the connection block 30c is entirely flat, and a part of the upper face 48a serves as a supporting face. The inlet block 31a has an inlet port 54, which communicates with the inside of the second end of the header pipe 25b'. Refrigerant, which comes in through the inlet port 54, flows through the heat transferring 28a in a zig-zag fashion as indicated by arrows in FIG. 5 between the couple of the header pipes 25a' and 25b', and reaches the discharging port of the connection block. In the embodiment, the inlet port 54 corresponds to an opening at the upstream end of the condenser 2, and the discharging port, to an opening of the downstream end thereof. The feeding port corresponds to an opening at the upstream end of the subcondenser 53.

A mounting block 36c is firmly attached to the lower end of a case 35a forming a liquid tank 3, which is connected in series between the condenser 2 and the subcondenser 53 when viewed in the direction of the refrigerant flow. The mounting block 36c is detachable from the connection block 30c. The upper half of the mounting block 36c is protruded toward the header pipe 25a'. The under face of the protruded part is used as a flat supported face 42a, which is to be in close contact with the upper face 48a. In a state that the upper face 48a is brought into contact with the supported face 42a, a bolt 43a is passed through the central part of the lower part of the mounting block 36c, and screwed into a threaded hole, which is formed in the mounting block 36c at a part thereof between the discharging port and the feeding port, and tightened. In this way, the mounting block 36c is firmly coupled with the connection block 30c. In this state, the weight of the liquid tank 3 is received by the connection block 30c. The discharging port and the feeding port of the connection block 30c are horizontally aligned, and a take-in port and a discharging port (not shown) of the same are also horizontally aligned.

An outlet block 55 with an outlet port 44a is fastened to the upper side of the first end of the upper header pipe 25b'. The outlet port 44a communicates with the inside of the first end of the upper header pipe 25b'. After passing through the liquid tank 3, the refrigerant flows from the lower header pipe 25a' to the upper header pipe 25b', and reaches the inside of the first end of the upper header pipe 25b'. The refrigerant is discharged from the outlet port 44a, and sent to the evaporator 5 (see FIG. 23), by way of the expansion valve 4. As described above, the present invention may be applied to such a construction that the header pipes 25a' and 25b' are disposed vertically spaced from each other, and the refrigerant is made to flow between those header pipes in the vertical direction.

5th Embodiment

Figure 6:
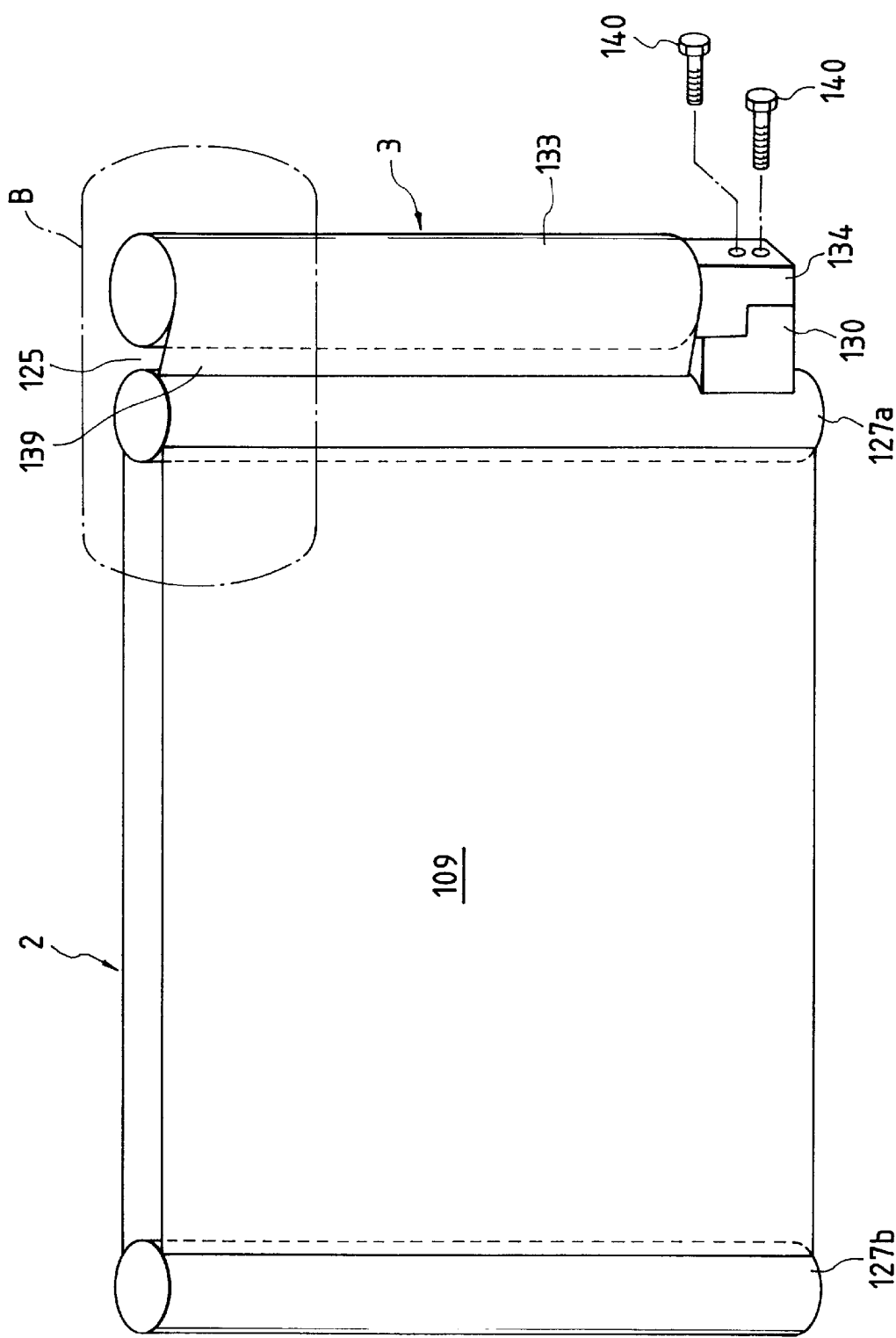
FIG. 6 is a perspective view showing a liquid-tank/subcondenser combined condenser structure according to a fifth embodiment of the present invention.
Figure 7:
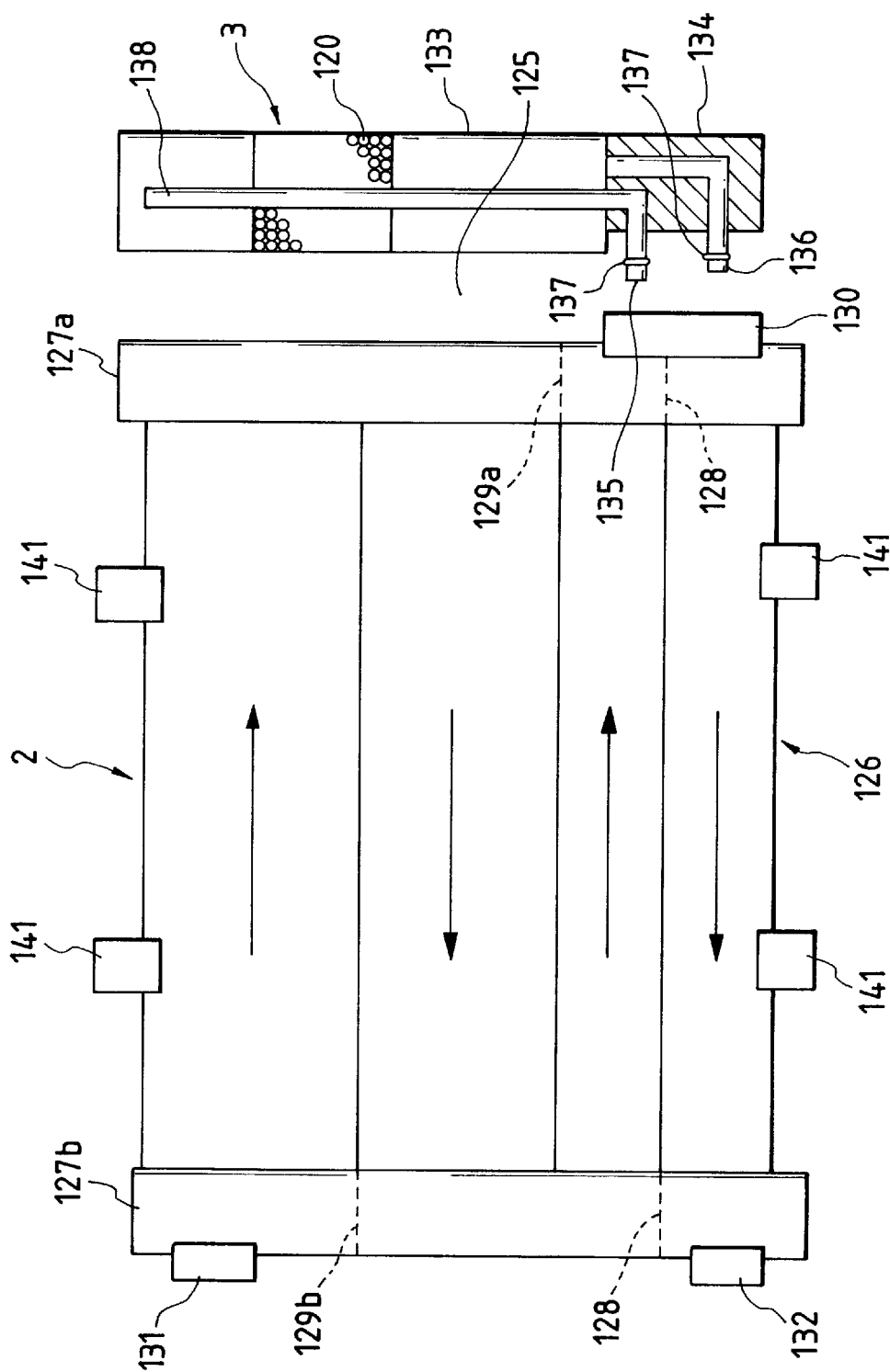
FIG. 7 is a diagram showing a liquid-tank/subcondenser combined condenser structure according to the fifth embodiment in a state that a condenser and subcondenser are removed from the structure.

FIGS. 6 to 11 show a fifth embodiment of the present invention. In the embodiment, the invention is incorporated into a condenser with a liquid tank and a subcondenser (referred to as a liquid-tank/subcondenser combined condenser structure). As shown in FIG. 7, a condenser 2, a liquid tank 3 and a subcondenser 126 are arranged serially from top to bottom with respect to the flow (indicated by arrows) of the refrigerant. As shown, the subcondenser 126 is disposed under the subcondenser 126, and the liquid tank 3 is disposed on the right side (when viewed in the drawing) of the condenser 2 and the subcondenser 126.

In the fifth embodiment, partitioning plates 129a and 129b are provided inside the middle of the header pipes 127a and 127b, respectively. A connection block 130 is fixed to the outer surface of the lower part of the header pipe 127a (the right header pipe in FIG. 7), and an entrance block 31 is fixed to the outer surface of the upper part of the header pipe 127b (the left header pipe in FIG. 7). The connection block 130 includes a discharging port located at the upper part thereof, and a feeding port at the lower part thereof. The discharging port communicates with the inside of the portion the right header pipe 127a above the partitioning wall 128. The feeding port communicates with the inside of the remaining portion of the right header pipe 127a below the partitioning walls 128. The entrance block 131 includes an inlet port, which communicates with the inside of the portion of the left header pipe 127b above the partitioning wall 129b. The refrigerant is fed from the inlet port into the condenser 2, and in the condenser 2 flows through the heat transferring pipes between the header pipes 127a and 127b in the directions of arrows in FIG. 7, and reaches the discharging port. The inlet port corresponds to an opening at the upstream end of the condenser 2, and the discharging port corresponds to an opening at the downstream end thereof. The feeding port corresponds to an opening of the upstream end of the subcondenser 126.

In the subcondenser 126, one or a plural number of subheat-transferring pipes (e.g., the flat heat transferring pipes 7 in FIG. 24) are provided between the inner surfaces of the remaining portions of the header pipes 127a and 127b, viz., the portions thereof below the partitioning walls 128. In this case, both ends of the subheat-transferring pipes, respectively, pass through the inner walls of the header pipes 127a and 127b in air- and liquid-tight sealing manner. Those subheat-transferring pipes 133 are horizontally parallel but vertically spaced. Corrugated fins 134 (e.g., the fins 8 in FIG. 24) are located between the adjacent subheat-transferring pipes. An outlet block 132 with an outlet port is fixed to the outer surface of the lower portion of the left header pipe 127b. The outlet port of the outlet block 132 communicates with the inside of the remaining portion of the left header pipe 127b, viz, the lower portion thereof below the partitioning wall 128, and corresponds to an opening at the downstream of the subcondenser 126. Reference numeral 141 designates brackets for mounting the structure to the car body.

The liquid tank 3 includes a cylindrical case 133 and a mounting block 134. The top end of the case 133 is closed. The mounting block 134 is fixed to the lower end of the case 133. The mounting block 134 is detachably mounted on the connection block 130. Upper and lower threaded holes are bored in the flange of the connection block 130. Upper and lower through-holes are bored in the mounting block 134 at locations aligned with the threaded holes of the connection block 130. Bolts 140 are passed through the through-holes of the mounting block 134 and screwed into the threaded holes of the connection block 130, to thereby firmly couple the mounting block 134 with the connection block 130.

A take-in port 135 and a discharging port 136 are protruded from the upper and lower places of the side surface of the mounting block 134, respectively. In a state that the mounting block 134 is firmly coupled with the connection block 130 by means of the bolts 140, the take-in port 135 and the discharging port 136 are communicatively coupled with the discharging port and the feeding port of the connection block 130, respectively. O rings 137 are applied to the outer surfaces of the take-in port 135 and the discharging port 136, in order to seal the connecting part between the take-in port 135 and the discharging port and that between the discharging port 136 and the feeding port. These O rings 137 are brought into contact with the inner surfaces of the discharging port or the feeding port, to thereby prevent the refrigerant from through the connecting parts. The shapes of the connection block 130 and the mounting block 134 illustrated in FIG. 6 are different from those illustrated in FIG. 7. Either of the blocks of the FIG. 6 type and those of the FIG. 7 type may be used. The shapes of those blocks are not essential to the present invention, and hence no further description of them will be given here.

The take-in port 135 is communicatively connected to the lower end of a refrigerant transporting pipe 138. The upper end of the refrigerant transporting pipe 138 is opened into the upper portion in the case 133. The refrigerant is discharged from the discharging port at the downstream end of the condenser 2 into the take-in port 135, and transported by the refrigerant transporting pipe 38 to the upper portion of the case 133.

In a state that the mounting block 134 is firmly coupled with the connection block 130 by means of the bolts 140, the case 133 of the liquid tank 3 is disposed on the right side (when viewed in the drawing) of and parallel to the right header pipe 27a. Accordingly, a gap 125 is present between the right header pipe 127a and the cylindrical case 133.

Figure 10:
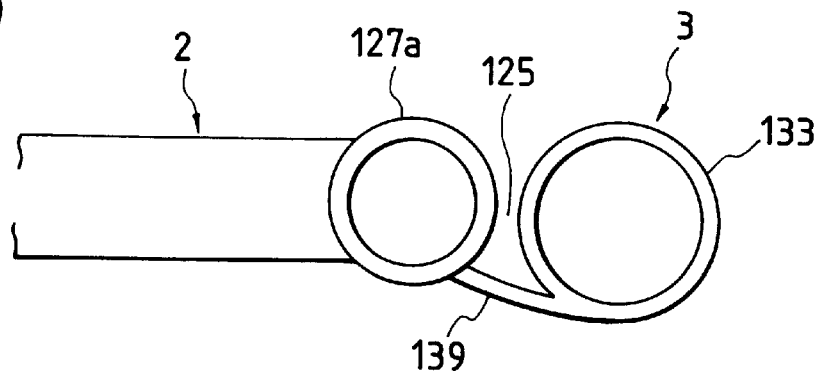
FIG. 10 is a plan view showing an example of a guide plate assembled into the condenser structure of FIG. 6 in a state that the upper lid is removed.
Figure 11:
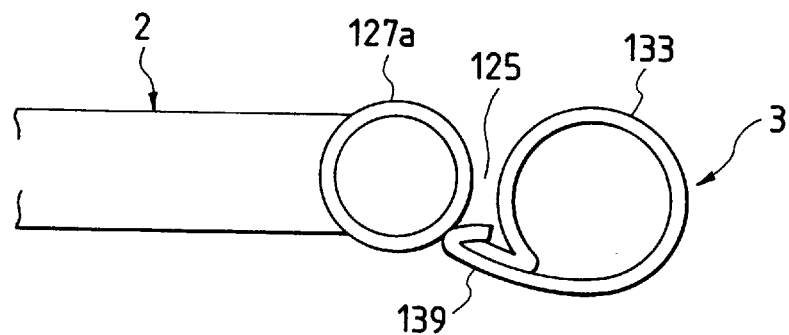
FIG. 11 is a plan view showing another example of a guide plate assembled into the condenser structure of FIG. 6 in a state that the upper lid is removed.

A guide plate 139 is extended to the right header pipe 127a from a part of the outer surface of the case 133 where is protruded beyond the front side (the lower surfaces in FIGS. 10 and 11) of the right header pipe 127a to the windward side (the lower side in FIGS. 10 and 11). The extreme end (of the guide plate 139 is brought into contact with or in proximity to the side part of the front side of the right header pipe 127a. The front side of the guide plate 139, as shown in FIGS. 10 and 11, is slanted to the leeward side (the upper side in FIGS. 10 and 11) from the outer surface of the case 133 as it approaches to the front side of the header pipe 127a.

The guide plate 139 may be formed integral with the cylindrical case 133 in a state that it is put on the outer surface of the cylindrical case 133. Any suitable structure may be used for constructing the guide plate and the case in an integral form. In the embodiment, the structure of the cylindrical case 133 determines the integrally forming structure. In a case that the cylindrical case 133 is formed by one-piece molding of aluminum member, the guide plate 139 and the cylindrical case 133 is formed such that the guide plate 139 is extended from the circumference of the cylindrical case 133 as shown in FIG. 10. In a case where the cylindrical case 133 is formed by curving an aluminum plate member, the plate member is circularly curved, and both ends thereof are joined together, and the joined part is tangentially extended from the circumference of the formed circle. As a result, the guide plate 139 is formed integral with the cylindrical case 133 (see FIG. 11). In either case, the front side of the guide plate 139 is slanted in the above-mentioned direction. The extreme end of the guide plate 139 is brought into contact with or in proximity to the right position on the outer surface of the right header pipe 127a when viewed from the front. When it is brought into contact with the right position, the contact portion may be hard soldered, if desired. The hard soldering provides a satisfactory strong coupling of the cylindrical case 33 with the right header pipe 127a. In this case, there is no need of using coupling means, for example, brackets, for coupling the upper portion of the cylindrical case 133 with the upper portion of the right header pipe 127a.

To assemble the thus constructed liquid-tank/subcondenser combined condenser structure of the present invention into a vapor compressing type refrigerator, the downstream end of the refrigerant pipe connecting to the compressor 1 (FIG. 23) is connected to the inlet port of the inlet block 131, and the upstream end of the refrigerant pipe connecting to the evaporator 5 (FIG. 23) is connected to the outlet port of the outlet block 132. In this state, the compressor 1 is operated. Then, the liquid-tank/subcondenser combined condenser structure condenses the refrigerant received from the compressor 1 to supercool the refrigerant, and feeds the supercooled refrigerant to the evaporator 5.

The refrigerant gas is fed from the inlet port of the inlet block 131 to the condenser 2, and the refrigerant gas flows between the header pipes 127a and 127b, through the plural number of heat transferring pipes of the condenser 2. During the flowing of the refrigerant gas, the desired heat exchange is carried out between the refrigerant gas and air which flows along the heat transferring pipes 128 and through the spaces of the fins. The refrigerant gas is condensed and liquidized. The resultant liquid refrigerant is sent from the discharging port of the connection block 130 to the take-in port 135 of the mounting block 134 forming the liquid tank 3. The liquid refrigerant, which reaches the take-in port 135, is then sent through the refrigerant transporting pipe 138 to the upper portion of the case 133, and flows down within the case 133. The liquid refrigerant, when flowing down, passes through the filter and the drying agent 120, so that the water content, foreign matters, and the like are removed from the liquid refrigerant. Then, the refrigerant is sent through the discharging port 136 to the feeding port of the connection block 130. The liquid refrigerant, which reaches the feeding port, flows through the subheat-transferring pipes of the subcondenser 126. When the refrigerant flows through the subheat-transferring pipes, it is supercooled. The liquid refrigerant thus supercooled is sent to the evaporator 5, through the outlet port of the outlet block 132.

In the liquid-tank/subcondenser combined condenser structure, there is no case where heat of the right leader pipe 127a is directly transmitted to the case 133 of the liquid tank 3. More exactly, the gap 125 that is present between the outer surface of the header pipe 106a and the inner surface of the case 114, prevents heat from being directly transmitted from the right header pipe 127a to the cylindrical case 133. The guide plate 139 often allows heat to flow from the right header pipe 127a to the cylindrical case 133. If heat is transmitted by the guide plate 139, the temperature rise on the cylindrical case 133 is not large since the cross sectional area of the guide plate 139 is small, and air at low temperature flows along the front side surface of the guide plate 139 as will be described later. Consequently, the heat generated by the right header pipe 127a will not increase temperature of the liquid refrigerant contained in the liquid tank 3, and the performances of the vapor compressing type refrigerator are not degraded. Further, the liquid-tank/subcondenser combined condenser structure may be manufactured by only the aluminum hard soldering work since any other member than the heat insulating member and aluminum member are not used. Therefore, the manufacturing work is simplified and the cost to manufacture is reduced.

The gap 125, which is present between the outer surface of the header pipe 106a and the inner surface of the case 114, is closed by the guide plate 139. In other words, the guide plate 139 blocks the flow of the low temperature air into the gap 125 (The low temperature air flows bypassing the heat transferring pipe and the fins.). In this case, the air stream, which otherwise would be directed to the gap 125 from the front side, flows along the front surface and guided to the condenser 2. Accordingly, a sufficient amount of air flows through the spaces defined by the heat transferring pipes of the condenser 2 and the fins. A satisfactorily improved efficiency of the condenser 2 is secured.

Figure 8:
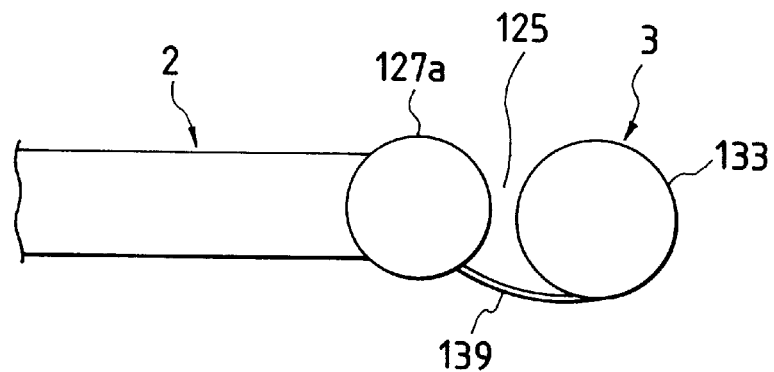
FIG. 8 is a plan view showing the right portion in FIG. 6.
Figure 9:
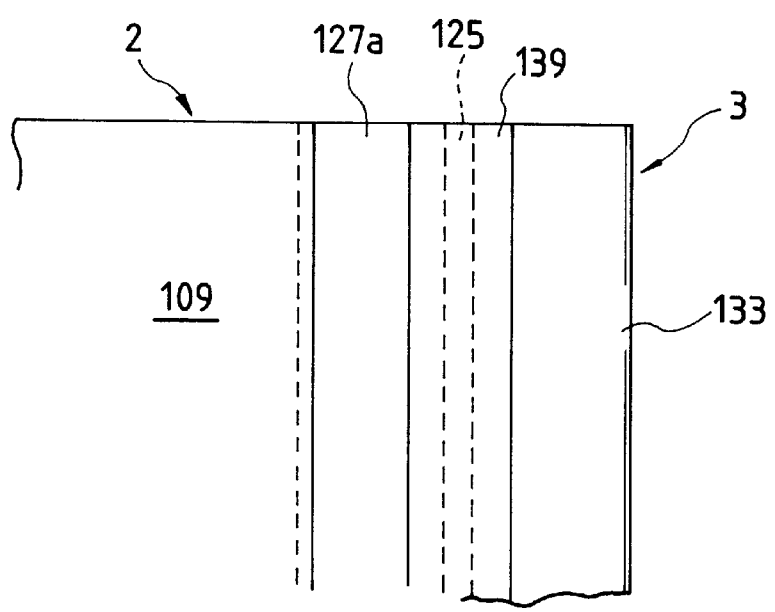
FIG. 9 is a front view showing a portion B in FIG. 6.

In the illustrated embodiment, the liquid tank 3 is slightly displaced to the front from the right header pipe 127a (the word "front" means the front of a car when viewed in the advancing direction of the car, and in FIGS. 6, 7 and 9, it is this side, and in FIGS. 8, 10 and 11, it is the lower side). Accordingly, the rear part of the liquid tank 3 is not protruded backward beyond the rear sides of the condenser 3 and the subcondenser 126. The condenser 2 and the subcondenser 126, which form the vapor compressing type refrigerator for a car air conditioner, is frequently located in immediate proximity to the front of a radiator for radiating heat from the cooling water. If the rear part of the liquid tank 3 is protruded backward beyond the rear sides of the condenser 2 and the subcondenser 126, it is difficult to place the liquid-tank/subcondenser combined condenser structure in immediate proximity to the front of the radiator. However, in the illustrated embodiment, the rear part of the liquid tank 3 is not protruded backward beyond the rear sides of the condenser 2 and the subcondenser 126, and then it is easy to place the liquid-tank/subcondenser combined condenser structure in immediate proximity to the front of the radiator. In other words, the invention provides easy design of automobiles.

6th Embodiment

Figure 12:
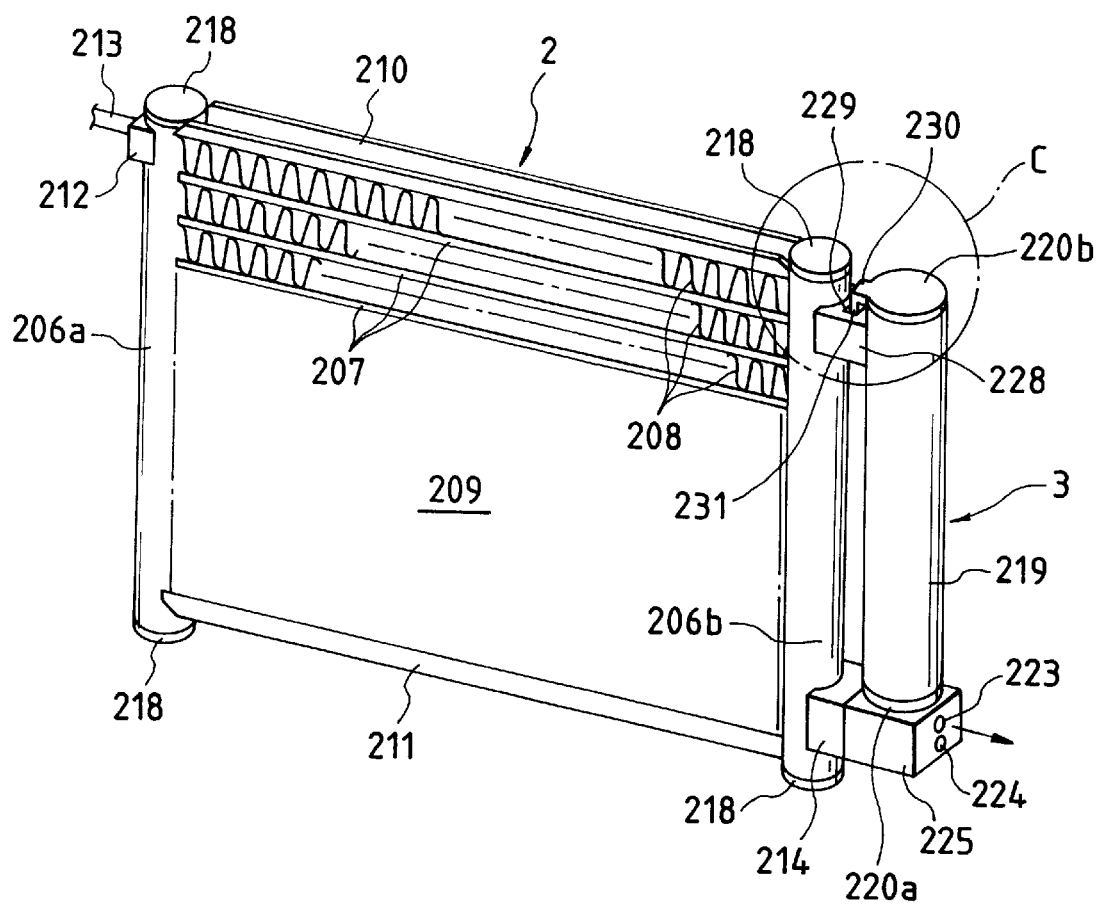
FIG. 12 is a perspective view showing a sixth embodiment of the present invention.
Figure 13:
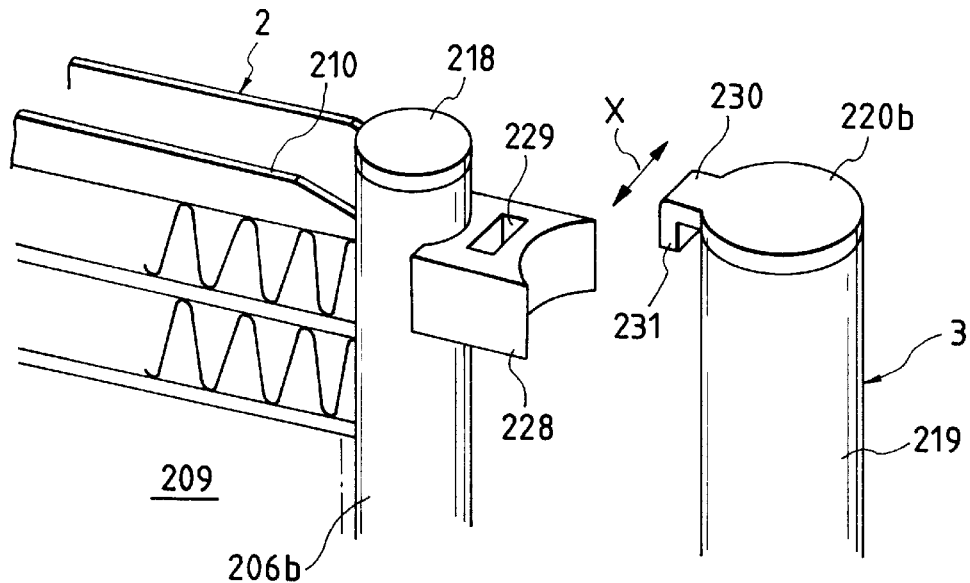
FIG. 13 is an enlarged view showing a portion C in FIG. 12, the illustration showing a state of the condenser structure before a hook-like piece of a liquid tank is put into a depressed part of a condenser.

FIGS. 12 and 13 show a condenser with a liquid tank of a sixth embodiment of the present invention. In this embodiment, a receiving bracket 228 is firmly attached to the upper end of the right header pipe 206b by hard soldering. One side (the left side in FIGS. 12 and 13) of the receiving bracket 228 is incurved at a curvature nealy equal to that of the outer surface of right header pipe 206b. The other side (the right side in FIGS. 12 and 13) is incurved at a curvature nearly equal to that of the outer surface of the liquid tank 3. A depressed part 229 is formed in the top face of the receiving bracket 228. The depressed part 229 may have the bottom or a through-hole may be used instead of the depressed part 229 with the bottom. If the through-hole is used, there is no need of the vertical adjustment in the stage of assembling.

On the other hand, a hook-like piece 230 is radially and outwardly extended from the circumference edge of the lid 220b. The extended part of the hook-like piece 230 is bent toward the base (lower side in FIGS. 12 and 13) when viewed in the axial direction (the vertical direction in FIGS. 12 and 13) of the cylindrical case 219. The bent extended part serves as an engaging part 231. The dimension of the engaging part 231 is selected such that when it is inserted into the depressed part 229, it is immovable therein at least in the width direction (of an arrow X in FIG. 13).

In coupling the thus constructed condenser 2 with the liquid tank 3, the engaging part 231 is put in the depressed part 229 in a slightly movable state. Then, the take-in port 222 is inserted into the discharging port 216. In this state, the bolt 226 is passed through the through-hole 224, and the threaded end part of the bolt 226 is screwed into the threaded hole 217, as shown in FIG. 7. As a result, the condenser 2 is firmly attached to the liquid tank.

In this embodiment, the engaging part 231 of the liquid tank 3 can readily be put in the depressed part 229 of the condenser 2. Accordingly, the liquid tank 3 can be jointed to the condenser 2 simply and easily. Further, when the liquid tank 3 is removed from the condenser 2 for repairing and part replacing purposes, after loosing the bolts 226, the user merely disengages the engaging part 231 from the depressed part 229 so as to remove the liquid tank 3 easily.

7th Embodiment

Figure 14:
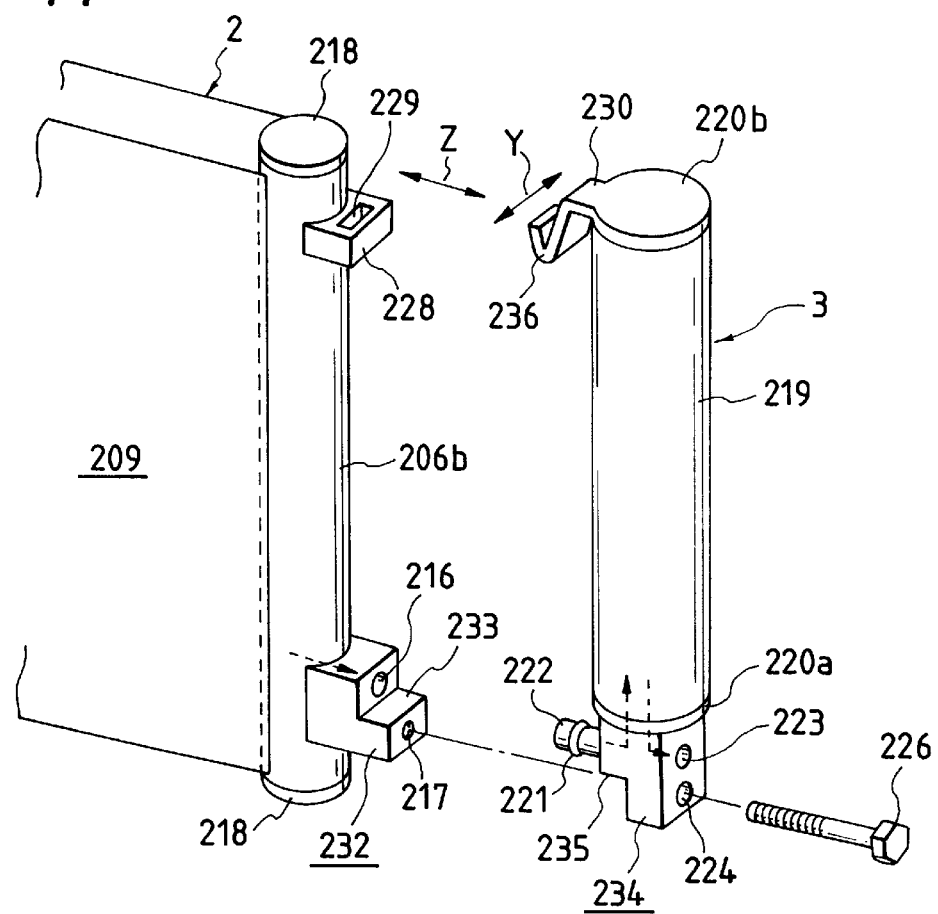
FIG. 14 is a perspective view showing a key portion of a seventh embodiment of the present invention, the illustration showing a state of the condenser structure before the liquid tank is coupled with the condenser.

FIG. 14 shows a seventh embodiment of the present invention. The hook-like piece 230a is provided with an elastic engaging part 236, which is formed by bending the extended part of the hook-like piece 230a like U in cross section. The engaging part 236 of the hook-like piece 230a is dimensioned such that when it is put in the depressed part 229 of the left header pipe 206b, it is immovable at least in the width direction (direction Y in FIG. 14) and it is elastically movable in the diameter direction (the direction Z in FIG. 14). Incidentally, the hook-like piece 230 shown in FIGS. 12 and 13 may be combined with the connection block 232 and the mounting block 234 shown in FIG. 14.

8th Embodiment

Figure 15:
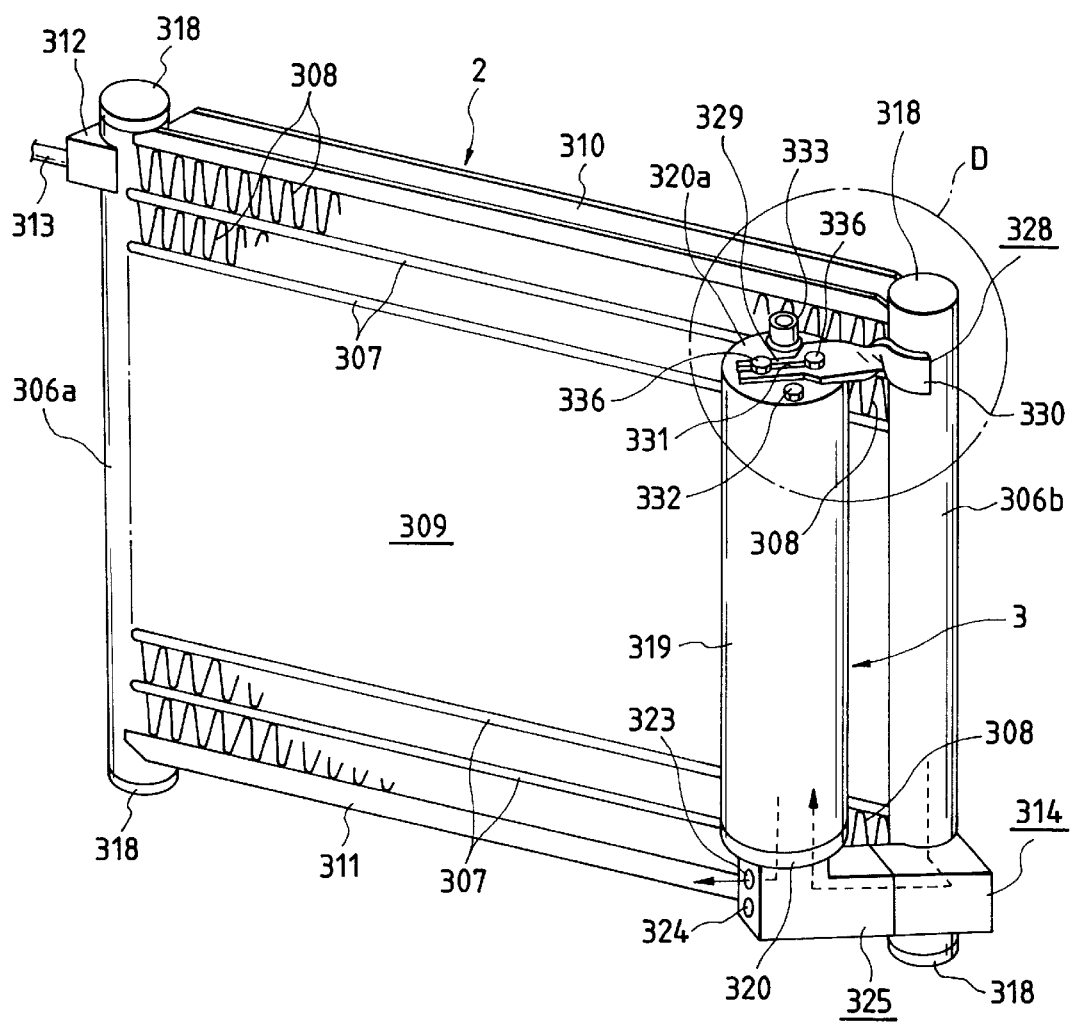
FIG. 15 is a perspective view showing an eighth embodiment of the present invention.
Figure 16:
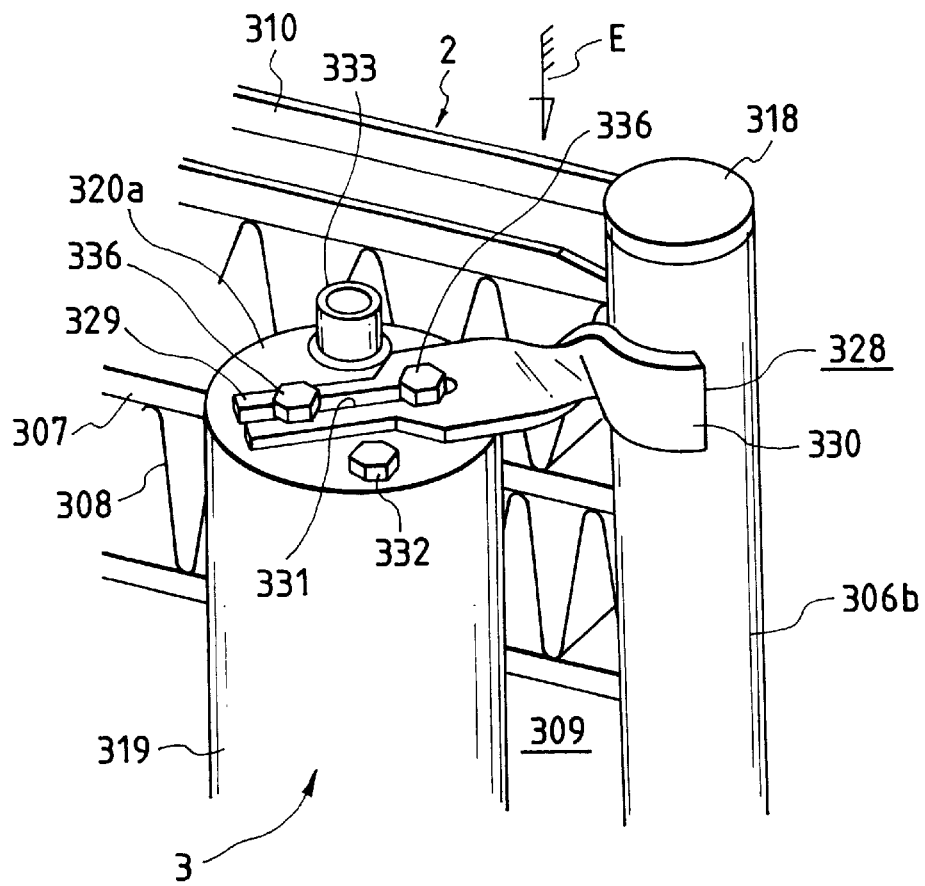
FIG. 16 is an enlarged view showing a portion D in FIG. 15 which contains a header/liquid-tank coupling structure incorporating the present invention.
Figure 17:
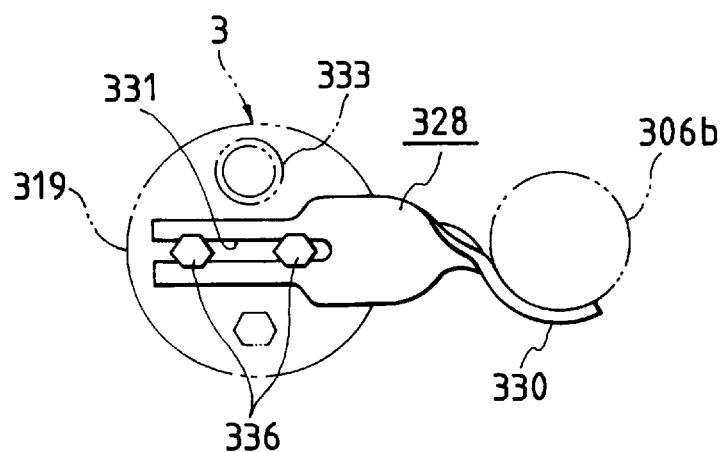
FIG. 17 is a plan view showing the header/liquid-tank coupling structure when viewed in the direction of an arrow E in FIG. 16.
Figure 18:
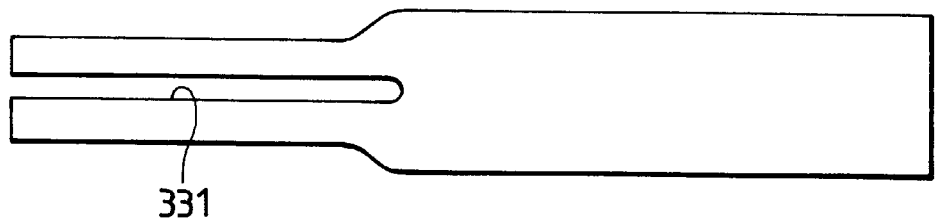
FIG. 18 is a plan view showing a stuff of a support bracket.

FIG. 15 shows a condenser structure with a liquid tank of an eighth embodiment of the present invention. In this embodiment, a support bracket 328 that is horizontally extended is fixed to the side face of the upper part of the header 306b by hard soldering, for example. The support bracket 328 includes a support arm 329, which is put on the upper surface of a lid 320a for closing the opening at the upper end of the liquid tank 3, and a base 330, which is firmly attached to the side face of the upper part of the header pipe 306b. The support bracket 328 is formed in the following manner. A plate made of aluminum alloy, for example, is punched to have a shape as shown in FIG. 18. A portion (the left portion in FIG. 18) of the punched plate, of which the width (the vertical length in FIG. 18) is small, serves as the support arm 329, and the remaining portion thereof (the right portion in FIG. 18) serves as the base 330. A slit 331 as a connecting passage means is formed in the left portion of the punched plate. Either of the right and left hand portions of the punched plate or stuff are twisted 90° with respect to the center of the stuff off the slit 331, to thereby form such a plate member that the surfaces of the right and left hand portions thereof are orthogonally oriented, as shown in FIGS. 15 to 17. The right hand portion of the plate member is curved to be arcuate in conformity with the outer surface of the header 306b. The curve portion is the base 330 of the support bracket 328.

The liquid tank 3 includes a cylindrical case 319, a lid 320 for closing the opening at the lower end of the cylindrical case 319, and a lid 320a for closing the opening at the upper end of the case. A mounting block 325 is fastened to the lower surface of the lid 20a by welding, for example. The mounting block 325 includes a take-in port 322 with an O ring 321 attached to the extreme end thereof (see FIG. 15, but not illustrated in FIGS. 15 to 18), an outlet port 323, and a through-hole 324. The base of the take-in port 322 and the base of the outlet port 323 pass through the lid 320, and communicates with the inside of the cylindrical case 319. Two threaded holes (not shown) with the bottoms are formed in the upper surface of the lid 320a. A fusible plug 332 and a pressure switch 333 are provided on the upper surface of the lid 320a. The fusible plug 332 functions to release refrigerant when temperature and pressure exceed preset values. The pressure switch 333 senses an internal pressure and turns on and off a drive force to the compressor. The threaded holes are aligned and spaced from each other on the diameter of the upper surface of the lid 320a. The diameter of each bottom of the thread of the threaded hole is nearly equal to or slightly smaller than the width of the slit 331. The fusible plug 332 and the pressure switch 333 are disposed on both sides of the straight line interconnecting the threaded holes.

In thus constructed condenser 2 with the liquid tank 3, those are temporarily coupled with each other by loosely screwing bolts 336 into the threaded holes of the lid 320a. The support arm 329 of the support bracket 328 is put on the upper surface of the lid 320a in a state that the threaded parts of the bolts 336 are inserted into the slit 331. In this state, the support bracket 328 is slightly movable with respect to the bolts 336. At this time, the take-in port 322 is inserted into the discharging port 316. In this state, the connection and mounting blocks 314, 325 are connected as a bolt. As a result, the upper end of the liquid tank 3 is joined to the side face of the upper part of the header 306b in a state that the lower ends of the liquid tank 3 and the header 306b are joined to each other, and accordingly, the liquid tank 3 and the header 306b are reliably and immovably coupled with each other.

In this embodiment, the upper end of the liquid tank 3 can be joined to the condenser 2 by merely tightening the bolts 336 inserted into the slit 331. Accordingly, the coupling work is simple and reliable. Further, when the liquid tank 3 is often removed from the condenser 2 for repairing and part replacing purposes, the user only has to loosen the bolts 36.

Furthermore, the support bracket 328 is formed by press working the plate member. Accordingly, it can be easily and inexpensively formed. If the header 306b is constructed with a clad member comprising a lamination of soldered layers of aluminum alloy, the header 306b and the support bracket 328 may be soldered in a furnace in the process of soldering the core section.

9th Embodiment

Figure 19:
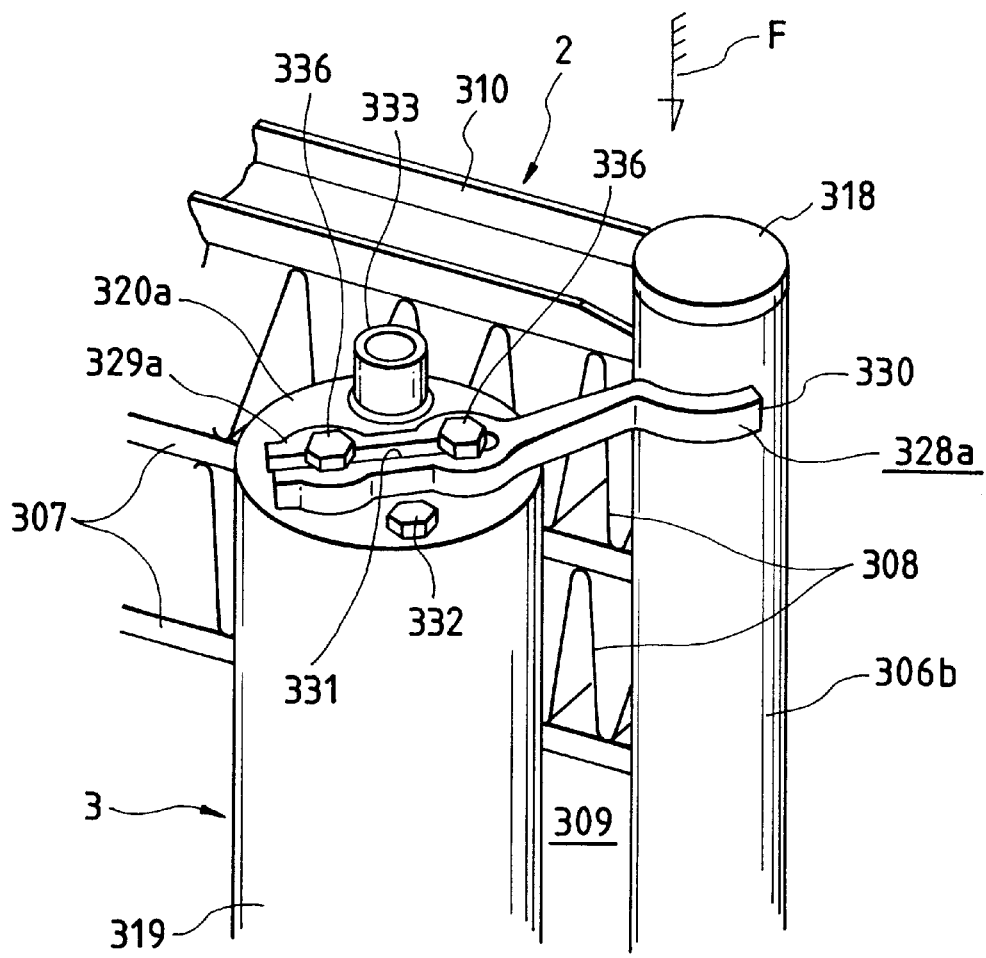
FIG. 19 is an enlarged view showing a portion D in FIG. 15 which is a header/liquid-tank coupling structure according to a ninth embodiment the invention.
Figure 20:
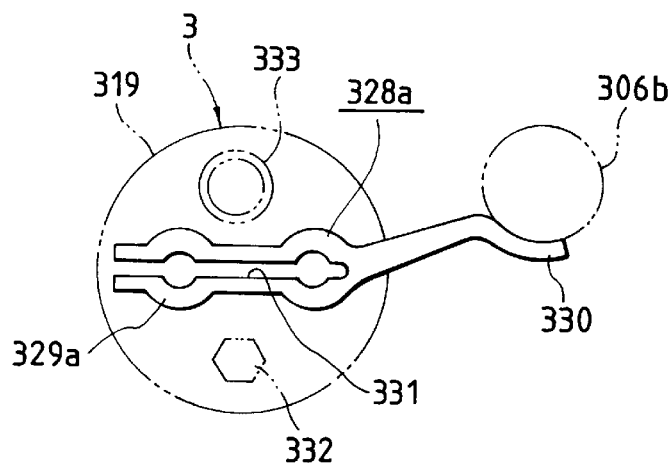
FIG. 20 is a plan view showing the header liquid-tank coupling structure when viewed in the direction of an arrow F in FIG. 19.

FIGS. 19 and 20 show a ninth embodiment of the present invention. In this embodiment, a support bracket 328a for coupling the condenser 2 with the liquid tank 3 is constructed as described hereinafter. The support bracket 328a, as in the eighth embodiment, includes a support arm 329a and a base 330. The support arm 329a includes a pair of expanded portions. The arcuate portions of the expanded portions are disposed so as to face the threaded holes (not shown) formed in the lid 320a for closing the opening at the upper end of the cylindrical case 319 of the liquid tank 3. A slit 331 is formed in the central part of the support arm 329a when viewed in the width direction (the vertical direction in FIG. 20). The base 330 is curved to be arcuate in conformity with the outer surface of the header 306b. The support bracket 328a is manufactured by extrusion molding metal stuff of aluminum alloy, for example.

The support bracket 328a thus formed is coupled with the header 306b such that, as shown in FIG. 19, the base 330 of the bracket is fastened to the side face of the upper part of the header 306b by hard soldering, for example, in a state that the support arm 329a is horizontally extended. The bolts 336 are screwed into the threaded holes of the lid 320a and tightened in a state that the lower surface of the support arm 329a is put on the upper surface of the lid 320a. With this, the support bracket 328a supports the upper end or the liquid tank 3. The remaining construction and the operation of the second embodiment, inclusive of the process of coupling the liquid tank 3 with the header 306b, are similar to those of the first embodiment. It is noted that the support bracket 328a of the second embodiment is manufactured by extrusion molding, and the thickness of the bracket is large. Accordingly, its rigidity is large. Also in this embodiment, if the header 306b is constructed with a clad member comprising of a lamination of soldered layers of aluminum alloy, the header 306b and the support bracket 328 may be waxed in a furnace, in the process of soldering the core section.

10th Embodiment

Figure 21:
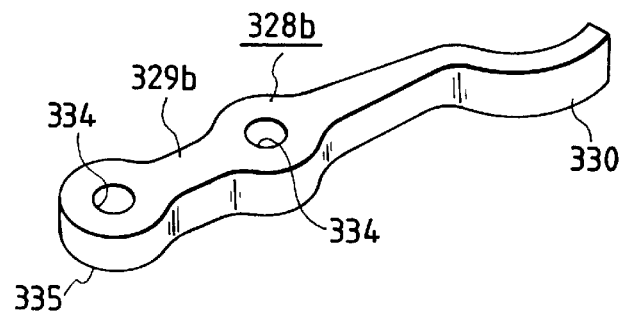
FIG. 21 is a perspective view showing a support bracket constructed according to a tenth embodiment of the present invention.
Figure 22:
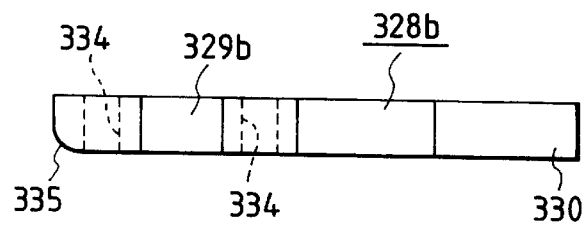
FIG. 22 is a side view of the support bracket of FIG. 21.

FIGS. 21 and 22 show a support bracket 328b used for an tenth embodiment of the present invention. In the eighth and ninth embodiments, the slit 331 is formed in the support bracket 328 (328a) (see FIGS. 15, 16, 17, 19 and 20). The slit 331 defines the "connecting passage means". In this embodiment, through-holes 334 to which bolts 336 are to be inserted are formed in the support bracket 328b, and form the "connecting passage means". In this embodiment, the under surface of the extreme end (the left end in FIGS. 21 and 22) of the support arm 329b is angle cut to form an angle-cut portion 335.

To support the upper end of the liquid tank 3 (FIGS. 15, 16 and 19) by using the support bracket 328b constructed described above, the side face of the lower part of the header 6b (FIGS. 15, 16 and 19) is joined to the lower end of the liquid tank 3 by means of the connection block 314 and the mounting block 325, and the like, and then, the bolts 336 are screwed into the threaded holes of the lid 320a and tightened. Further, in this embodiment, the under surface of the extreme end of the support arm 329b is angle cut to form an angle-cut portion 335. Therefore, there is no chance that the extreme end of the support arm 329b scratches the upper surface of the lid 320a. In this respect, a smooth assembling is secured.

The angle-cut portion 335 may be applied to the support brackets 328 and 328a in the eighth and ninth embodiments. The construction of the support bracket is not limited to those of the eighth to tenth embodiments, but it may have any construction if it can be joined to the upper end or the liquid tank by means of the bolt. One threaded hole of the lid 320a and one bolt 336 to be screwed into the threaded hole will do. The bolts 336 may be substituted by fusible plugs. The coupling structure for coupling the side face of the lower part of the header 306b with the lower end of the liquid tank 3 is also not limited to the above-mentioned ones.

According to the present invention, the condenser structure with a liquid-tank thus constructed has the following useful effects. No manufacturing cost is not increased. The efficiency of the condenser is improved. No temperature rise of the liquid tank is invited. The performances or the vapor compressing type refrigerator are improved. Further, the coupling structure reliably joins the liquid tank to the condenser, and makes the liquid tank immovable with respect to the condenser. In assembling the component parts into the liquid-tank combined condenser structure, the work to assemble is easy and hence efficient. The number of required components parts is reduced, leading to the reduction of cost to manufacture.

Furthermore, it is to be understood that the foregoing description and the accompanying drawings are not intended to limit the scope of the this invention; rather, various modifications or variations may be made by those of ordinary skilled in the art without departing from the scope of this invention which is defined by the appended claims.

What is claimed is:

1. A condenser structure with a liquid tank comprising:
   (1) a condenser including:
      a pair of header pipes spaced from each other;
      a plural number of heat transferring pipes disposed between said pair of header pipes so as to be spaced each other, both ends of said heat transferring pipes being opened to an inside of said header pipes; and
      fins disposed between said adjacent heat transferring pipes spaced each other;
   (2) a liquid tank fastened to a first header pipe so as to receive a liquid refrigerant discharged from said condenser;
   (3) first coupling means for detachably coupling said first header pipe with said liquid tank while securing a flowing path of said liquid refrigerant, said first coupling means being disposed between first ends of said first header pipe and said liquid tank; and
   (4) second coupling means for detachably coupling said first header pipe with said liquid tank so as to temporarily couple said first header pipe with said liquid tank before said first coupling means couples thereof, said second coupling means being disposed between second ends of said first header pipe and said liquid tank.

2. The condenser structure with a liquid tank according to claim 1, wherein said first coupling means includes:
   a connection block fastened to an outer surface of a first end of said first header pipe; and
   a mounting block fastened to said liquid tank and detachably coupled with said connection block.

3. The condenser structure with a liquid tank according to claim 2, wherein said connection block has an outlet port which communicates with a downstream end of said flowing path said liquid refrigerant of said condenser; and said mounting block has a take-in port which is provided on a side face of said mounting block and communicates with said outlet port in a state that said mounting block is fixedly coupled with said connection block, and a discharging port for discharging said liquid refrigerant.

4. The condenser structure with a liquid tank according to claim 2, wherein a threaded hole is bored in said connection block, a through-hole which is aligned with said threaded hole is bored in said mounting block, and a bolt is passed through said through-hole and screwed into said threaded hole so as to couple said connection block with said mounting block.

5. The condenser structure with a liquid tank according to claim 2, wherein said mounting block is couple with said connection block in such a manner that a portion of said mounting block is supported by a portion of said connection block.

6. The condenser structure with a liquid tank according to claim 5, wherein said connection block includes a supporting face, said mounting block includes a supported face, and said connection block and mounting block are coupled with each other in a state said supported face is put on said supporting face.

7. The condenser structure with a liquid tank according to claim 1, wherein said second coupling means is a support bracket having a base which is fixed to an outer surface of said second end of said first header pipe, and a support arm which is put on an upper surface of a lid for closing an end of said liquid tank.

8. The condenser structure with a liquid tank according to claim 7, wherein a slit is formed in an end of said support arm, and a bolt is inserted into said slit so as to couple said support arm with said lid.

9. The condenser structure with a liquid tank according to claim 7, wherein a through hole is formed in said support arm, and a bolt is inserted into said slit so as to couple said support arm with said lid.

10. The condenser structure with a liquid tank according to claim 1, wherein said second coupling means includes: a receiving bracket which is fixed to an outer surface of said second end of said first header pipe and has a depressed part; and a hook-like piece formed in a lid for closing an end of said liquid tank and engaging with said depressed part.

11. The condenser structure with a liquid tank according to claim 10, wherein said hook-like piece is formed so as to be bent right-angled.

12. The condenser structure with a liquid tank according to claim 10, wherein said hook-like piece is formed so as to have a U-shaped cross section and be elastically movable.

* * * * *